(12) United States Patent
Nakagawa et al.

(10) Patent No.: US 7,710,673 B2
(45) Date of Patent: May 4, 2010

(54) PHASE LOCKING APPARATUS, PHASE LOCKING METHOD, DATA REPRODUCING APPARATUS, DATA REPRODUCING METHOD, AND PROGRAMS

(75) Inventors: Toshiyuki Nakagawa, Kanagawa (JP); Seigo Taniguchi, Tokyo (JP)

(73) Assignee: Sony Corporation, Tokyo (JP)

( * ) Notice: Subject to any disclaimer, the term of this patent is extended or adjusted under 35 U.S.C. 154(b) by 938 days.

(21) Appl. No.: 11/430,231

(22) Filed: May 8, 2006

(65) Prior Publication Data

US 2006/0256462 A1   Nov. 16, 2006

(30) Foreign Application Priority Data

May 10, 2005   (JP)   ............................. 2005-137226

(51) Int. Cl.
*G11B 5/09* (2006.01)
(52) U.S. Cl. ............................. 360/39; 360/29; 360/40; 360/51; 360/65; 341/59
(58) Field of Classification Search ........................ None
See application file for complete search history.

(56) References Cited

U.S. PATENT DOCUMENTS

| 5,345,342 | A | * | 9/1994 | Abbott et al. ................... 360/48 |
| 5,469,462 | A | * | 11/1995 | Kahlman et al. ............. 375/232 |
| 5,677,802 | A | * | 10/1997 | Saiki et al. ..................... 360/51 |
| 5,754,352 | A | | 5/1998 | Behrens et al. |
| 5,805,024 | A | * | 9/1998 | Takashi et al. ................ 331/17 |
| 6,519,715 | B1 | * | 2/2003 | Takashi et al. ................ 714/32 |
| 6,646,822 | B1 | * | 11/2003 | Tuttle et al. .................... 360/46 |
| 6,690,635 | B2 | * | 2/2004 | Tonami .................... 369/59.22 |
| 6,757,863 | B2 | * | 6/2004 | Kaneshige et al. .......... 714/775 |
| 6,788,484 | B2 | * | 9/2004 | Honma ......................... 360/51 |
| 6,920,280 | B2 | * | 7/2005 | Okamoto ..................... 386/113 |
| 2003/0123362 | A1 | * | 7/2003 | Graffouliere ............. 369/53.34 |

FOREIGN PATENT DOCUMENTS

| JP | 09-231506 | 9/1997 |
| JP | 10-069727 | 3/1998 |
| JP | 10-508135 | 8/1998 |
| JP | 2000-076805 | 3/2000 |
| JP | 2001-358782 | 12/2001 |
| JP | 2002-042428 | 2/2002 |

OTHER PUBLICATIONS

Mark Spurbeck and Richard T. Behrens, "Interpolated Timing Recovery for Hard Disk Drive Read Channels" (Cirrus Logic 1997 IEEE, pp. 1618-1624).

* cited by examiner

*Primary Examiner*—Dismery E Mercedes
(74) *Attorney, Agent, or Firm*—Robert J. Depke; Rockey, Depke & Lyons, LLC.

(57) ABSTRACT

A phase locking apparatus is disclosed which, includes a phase error information detecting device to detect phase error information indicating the phase error. The device has a phase position determining device to determine, based on run length limited information, whether or not phase positions of a first and second value from among sampling values constituting synchronous data are under a reverse phase condition in effect when only one of the first and the second values is in excess of a predetermined threshold, and a phase error information calculating device to calculate the phase error information in each of two cases determined, one with the reverse phase condition found to be in effect and the other without effect.

22 Claims, 16 Drawing Sheets

F I G . 1 2

PR_(1,-1)
ver.0

| slice_D | slice_now | APPEARANCE | CORRECTION | phase_err | |
|---|---|---|---|---|---|
| 0 | 0 | ◎ | – | 0 | |
| 0 | 1 | ◎ | ◎ | FORWARD DIRECTION | phase_err |
| 0 | -1 | ◎ | ◎ | FORWARD DIRECTION | phase_err |
| 1 | 0 | ◎ | ◎ | FORWARD DIRECTION | phase_err |
| -1 | 0 | ◎ | ◎ | FORWARD DIRECTION | phase_err |
| 1 | 1 | × | – | – | |
| -1 | 1 | × | – | – | |
| 1 | -1 | × | – | – | |
| -1 | -1 | × | – | – | | phase_err = (data_now*slice_D) − (data_D*slice_now)

FIG.13

PR_(1,-1)
ver.1_1

| slice_D | slice_now | APPEARANCE | CORRECTION | phase_err | | |
|---|---|---|---|---|---|---|
| 0 | 0 | ◎ | — | 0 | | |
| 0 | 1 | ◎ | ◎ | FORWARD DIRECTION | phase_err | |
| 0 | -1 | ◎ | ◎ | FORWARD DIRECTION | phase_err | |
| 1 | 0 | ◎ | ◎ | FORWARD DIRECTION | phase_err | |
| -1 | 0 | ◎ | ◎ | FORWARD DIRECTION | phase_err | |
| 1 | 1 | × | ◎ | BACKWARD DIRECTION | rev_phase_err | ※ |
| -1 | -1 | × | ◎ | BACKWARD DIRECTION | rev_phase_err | ※ |
| 1 | -1 | × | ◎ | BACKWARD DIRECTION | rev_phase_err | ※ |
| -1 | 1 | × | ◎ | BACKWARD DIRECTION | rev_phase_err | ※ | phase_err = (data_now*slice_D) − (data_D*slice_now)
rev_phase_err = −phase_err

FIG. 14

PR_(1,-1)
ver.1_2

| slice_2D | slice_D | slice_now | APPEARANCE | CORRECTION | phase_err | |
|---|---|---|---|---|---|---|
| — | — | 0 | ◎ | — | 0 | |
| — | — | -1 | ◎ | ◎ | FORWARD DIRECTION | phase_err |
| — | — | -1 | ◎ | ◎ | FORWARD DIRECTION | phase_err |
| 0 | 1 | 0 | × | ◎ | FORWARD DIRECTION | phase_err |
| 1 | 1 | 0 | ◎ | — | 0 | |
| -1 | 1 | 0 | × | ◎ | FORWARD DIRECTION | phase_err |
| 0 | -1 | 0 | ◎ | ◎ | FORWARD DIRECTION | phase_err |
| 1 | -1 | 0 | × | ◎ | FORWARD DIRECTION | phase_err |
| -1 | -1 | 0 | × | — | 0 | |
| — | 1 | -1 | × | ◎ | BACKWARD DIRECTION | rev_phase_err |
| — | 1 | -1 | × | ◎ | BACKWARD DIRECTION | rev_phase_err |
| — | -1 | -1 | × | ◎ | BACKWARD DIRECTION | rev_phase_err |
| — | -1 | -1 | × | ◎ | BACKWARD DIRECTION | rev_phase_err | phase_err = (data_now*slice_D) − (data_D*slice_now)
rev_phase_err = −phase_err

FIG. 15

PR_(1,0,-1)
ver.0

| Slice_D | Slice_now | APPEARANCE | CORRECTION | phase_err |
|---------|-----------|------------|------------|-----------|
| 0 | 0 | ◎ | — | 0 |
| 0 | 1 | ◎ | — | 0 |
| 0 | -1 | ◎ | — | 0 |
| 1 | 0 | ◎ | — | 0 |
| -1 | 0 | ◎ | — | 0 |
| 1 | 1 | ◎ | ◎ | FORWARD DIRECTION phase_err |
| -1 | 1 | ◎ | ◎ | FORWARD DIRECTION phase_err |
| 1 | -1 | ◎ | ◎ | FORWARD DIRECTION phase_err |
| -1 | -1 | ◎ | ◎ | FORWARD DIRECTION phase_err | phase_err = (data_now*slice_D) − (data_D*slice_now)

FIG. 16

PR_(1,0,-1) ver.1_1

| | slice_2D | slice_D | slice_now | APPEARANCE | CORRECTION | phase_err | |
|---|---|---|---|---|---|---|---|
| | — | 0 | 0 | ◎ | — | 0 | |
| | — | 0 | -1 | ◎ | — | 0 | |
| | — | 0 | -1 | ◎ | — | 0 | |
| ※ | 0 | 1 | 0 | × | ◎ BACKWARD DIRECTION (2D) | rev_phase_err_2D | |
| | 1 | 1 | 0 | ◎ | — | 0 | |
| | -1 | 1 | 0 | × | ◎ | 0 | |
| ※ | 0 | -1 | 0 | × | ◎ BACKWARD DIRECTION (2D) | rev_phase_err_2D | |
| | 1 | -1 | 0 | ◎ | — | 0 | |
| | -1 | -1 | 0 | ◎ | — | 0 | |
| | — | 1 | 1 | ◎ | ◎ FORWARD DIRECTION | phase_err | |
| | — | -1 | 1 | ◎ | ◎ FORWARD DIRECTION | phase_err | |
| | — | 1 | -1 | ◎ | ◎ FORWARD DIRECTION | phase_err | |
| | — | -1 | -1 | ◎ | ◎ FORWARD DIRECTION | phase_err | | phase_err = (data_now*slice_D) − (data_D*slice_now)
phase_err_2D = (data_now*slice_D) − (data_2D*slice_D)
rev_phase_err = −phase_err
rev_phase_err_2D = −phase_err_2D

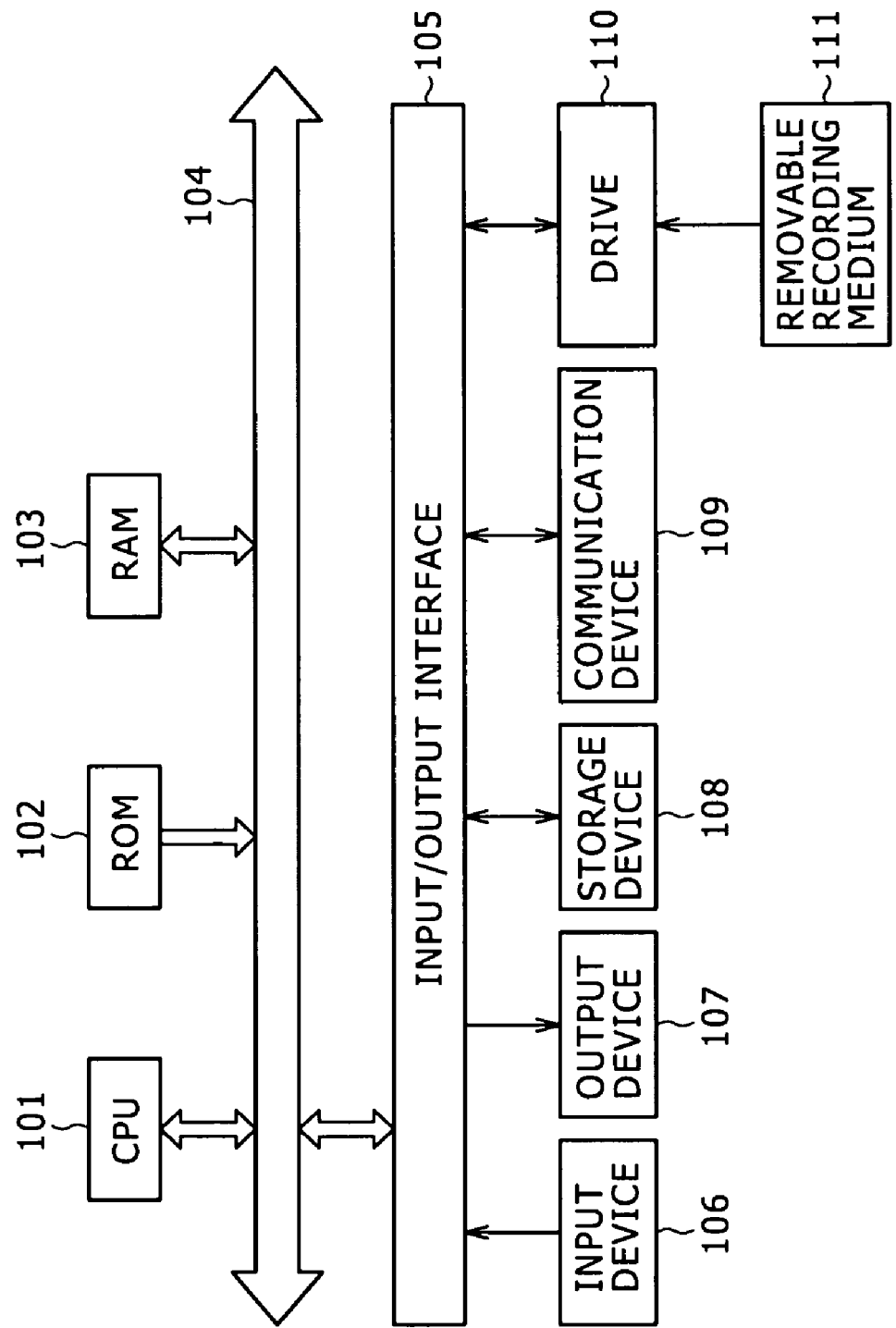

PHASE LOCKING APPARATUS, PHASE LOCKING METHOD, DATA REPRODUCING APPARATUS, DATA REPRODUCING METHOD, AND PROGRAMS

CROSS REFERENCES TO RELATED APPLICATIONS

The present invention contains subject matter related to Japanese Patent Application JP 2005-137226 filed with the Japanese Patent Office on May 10, 2005, the entire contents of which being incorporated herein by reference.

BACKGROUND OF THE INVENTION

1. Field of the Invention

The present invention relates to a phase locking apparatus, a phase locking method, a data reproducing apparatus, a data reproducing method, and programs. More particularly, the invention relates to a phase locking apparatus, a phase locking method, a data reproducing apparatus, a data reproducing method, and programs for stabilizing the performance of the data reproducing apparatus containing the phase locking apparatus regardless of various settings made on the data reproducing apparatus.

2. Description of Related Art

Digital PLL (phase locked loop) apparatus, one of the phase locking apparatuses introduced in recent years, is capable of feedback control based on phase error. This type of control is such that synchronous sampling data, converted from asynchronous sampling data corresponding to RLL code, is output with its waves shaped in equalized relation to a predetermined partial response method. Digital PLL setups are discussed illustratively in Japanese Patent Laid-open No. 2001-358782, Japanese Patent No. 3071142, Japanese Patent Laid-open No. Hei 10-69727, JP-A-H10-508135, Japanese Patent Laid-open No. 2000-76805, Japanese Patent Laid-open No. 2002-42428, and "Interpolated Timing Recovery For Hard Disk Drive Read Channels" by Mark Spurbeck and Richard T. Behrens (Cirrus Logic 1997 IEEE, pp. 1618-1624).

SUMMARY OF THE INVENTION

There has been a persistent problem with the PLL scheme above. Where a data reproducing apparatus (i.e., system) reproduces original data (in RLL code) from the synchronous sampling data output through PLL, the system as a whole can become unstable in operation depending on diverse settings made on the data reproducing apparatus. The instability occurs illustratively in the form of a sudden inability of the system to detect the error rate of data being reproduced.

The present invention has been made in view of the above circumstances and provides arrangements for stabilizing the performance of an entire data reproducing apparatus (system) containing a phase locking apparatus regardless of the various settings made on the data reproducing apparatus.

In carrying out the present invention and according one embodiment thereof, there is provided a phase locking apparatus. When data recorded on a recording medium as an RLL recording code where d>0 is read therefrom as data in asynchronous relation with a predetermined frequency, the apparatus generates synchronous data in synchronism with the predetermined frequency from the asynchronous data. The phase locking apparatus includes phase error information detecting means for detecting phase error information indicating a phase error in the synchronous data. The phase error information detecting means includes: a phase position determining means and phase error information calculating means. The phase position determining means determines, based on run length limited information, whether or not phase positions of a first value and a second value contiguous to the first value from among sampling values constituting the synchronous data are under a reverse phase condition in effect when only one of the first and the second values is in excess of a predetermined threshold. The phase error information calculating means calculates the phase error information in each of two cases determined, one with the reverse phase condition found to be in effect by the phase position determining means and the other without the reverse phase condition found to be in effect.

Preferably, the run length limited information may be information based on a minimum run length where d is at least 1.

The run length limited information may preferably be information indicating transitions of partial responses based on the limit of the minimum run length to the synchronous data.

Preferably, the partial responses based on the limit of the minimum run length to the synchronous data may occur where d=1 and PR(1, −1); and the phase position determining means may determine that the reverse phase condition is in effect if the transitions of the patterns occurring where d=1 and PR(1, −1) form a pattern which exist under the reverse phase condition and which does not exist without the reverse phase condition, the phase position determining means further determining that the reverse phase condition is not in effect if the transitions form any other pattern.

Preferably, the partial responses based on the limit of the minimum run length to the synchronous data may occur where d=1 and PR(1, 0, −1); and the phase position determining means may determine that the reverse phase condition is in effect if the transitions of the patterns occurring where d=1 and PR(1, 0, −1) form a pattern which exist under the reverse phase condition and which does not exist without the reverse phase condition, the phase position determining means further determining that the reverse phase condition is not in effect if the transitions form any other pattern.

The phase error information calculating means may preferably calculate the phase error information using at least the first value.

The phase error information calculating means may preferably calculate the phase error information using at least two of the sampling values within a predetermined range of the synchronous data including the first value, and at least two tentatively determined values with regard to these at least two sampling values within the predetermined range.

Preferably, the phase error information detecting means may include a tentatively determined value calculating means for calculating these at least two tentatively determined values with regard to these at least two sampling values within the predetermined range; and the phase position determining means may determine whether or not the reverse phase condition is in effect, using as the run length limited information these at least two tentatively determined values calculated by the tentatively determined value calculating means.

Preferably, the phase position determining means, having determined that the reverse phase condition is in effect, may further determine which of a plurality of patterns of the reverse phase condition is in effect; and the phase error information calculating means may calculate the phase error information for each of the plurality of patterns of the phase error information determined.

The phase error information calculating means may preferably calculate the phase error information in accordance with a first operational method of reference if the phase position determining means determines that the reverse phase condition is not in effect, the phase error information calculating means further calculating the phase error information in accordance with a second operational method different from the first operational method if the phase position determining means determines that the reverse phase condition is in effect.

The second operational method may preferably involve calculating as the phase error information a value having a sign different from that of the value calculated as the phase error information in accordance with the first operational method.

Preferably, the first operational method may involve outputting as the phase error information a value calculated by use of a predetermined operation expression; and the second operational method may involve outputting as the phase error information the value which is the same, except for a reversed sign, as the value calculated by use of the predetermined operation expression.

Preferably, the first operational method may involve outputting as the phase error information a value calculated by use of a predetermined operation expression; and the second operational method may involve outputting a predetermined value as the phase error information.

The predetermined value output by the second operational method may preferably be zero.

According to another embodiment of the present invention, there is provided a phase locking method for use with a phase locking apparatus which, when data recorded on a recording medium as an RLL recording code where d>0 is read therefrom as data in asynchronous relation with a predetermined frequency, generates synchronous data in synchronism with the predetermined frequency from the asynchronous data. The phase locking method includes the step of detecting phase error information indicating a phase error in the synchronous data. The phase error information detecting step includes the step of determining, based on run length limited information, whether or not phase positions of a first value and a second value contiguous to the first value from among sampling values constituting the synchronous data are under a reverse phase condition in effect when only one of the first and the second values is in excess of a predetermined threshold. The phase error information detecting step further includes the step of calculating the phase error information in each of two cases determined, one with the reverse phase condition found to be in effect in the phase position determining step and the other without the reverse phase condition found to be in effect.

According to a further embodiment of the present invention, there is provided a first program for causing a computer to execute a procedure including the same steps as those of the inventive phase locking method outlined above.

Through the use of the phase locking apparatus, phase locking method, and first program according to the present invention, when the data recorded on the recording medium as the RLL recording code where d>0 is read therefrom as data in asynchronous relation with a predetermined frequency, synchronous data is generated in synchronism with the predetermined frequency from the asynchronous data. At this point, phase error information indicating a phase error in the synchronous data is detected. Synchronous data (i.e., the next and subsequent sampling data) are generated on the basis of that phase error information. More particularly, based on run length limited information, it is determined whether the phase positions of a first value and a second value contiguous to the first value from among sampling values constituting the synchronous data are under a reverse phase condition in effect when only one of the first and the second values is in excess of a predetermined threshold. The phase error information is then calculated in each of two cases determined, one with the reverse phase condition found to be in effect in the phase position determining step and the other without the reverse phase condition found to be in effect.

According to an even further embodiment of the present invention, there is provided a data reproducing apparatus for reproducing data recorded on a recording medium as an RLL recording code where d>0. The data reproducing apparatus includes differentiating means, sampling means, and phase locking means. The differentiating means generates a differential response signal with regard to an analog signal read from the recording medium in a manner representing the data. The sampling means generates asynchronous data by sampling the differential response signal generated in analog form by the differentiating means in asynchronous relation with a predetermined frequency. The phase locking means generates synchronous data in synchronism with the predetermined frequency from the asynchronous data generated by the sampling means. The phase locking means includes phase error information detecting means for detecting phase error information indicating a phase error in the synchronous data. The phase error information detecting means includes phase position determining means and phase error information calculating means. The phase position determining means determines, based on run length limited information, whether or not phase positions of a first value and a second value contiguous to the first value from among sampling values constituting the synchronous data are under a reverse phase condition in effect when only one of the first and the second values is in excess of a predetermined threshold. The phase error information calculating means calculates the phase error information in each of two cases determined, one with the reverse phase condition found to be in effect by the phase position determining means and the other without the reverse phase condition found to be in effect.

Preferably, the data reproducing apparatus of one embodiment of the present invention may further include waveform shaping means for shaping into a predetermined waveform the asynchronous data generated by the sampling means in order to output the waveform-shaped asynchronous data. The data reproducing apparatus may further includes an AGC/DCC means for subjecting the asynchronous data coming from the waveform shaping means to auto gain control and direct current offset cancel in order to output the asynchronous data thus processed. The phase locking means of the apparatus may generate the synchronous data from the asynchronous data coming from the AGC/DCC means.

Preferably, the data reproducing apparatus of the present invention may further include: data detecting means for detecting a channel bit sequence corresponding to the RLL recording code from the synchronous data generated by the phase locking means; and decoding means for decoding the channel bit sequence detected by the data detecting means.

The phase locking means may preferably include a loop filter means, remainder accumulator means, and phase adjusting means. The loop filter means performs a loop filter operation using at least the phase error information detected by the phase error information detecting means in order to output a result of the operation. The remainder accumulator means performs a predetermined cumulative operation on the operation result coming from the loop filter means and, based on a result of the cumulative operation, to generate and output information necessary for adjusting phase positions of sampling values constituting the asynchronous data. The phase adjusting means adjusts the phase positions of sand sampling values constituting the asynchronous data by use of the information output from the remainder accumulator means in order to output as the synchronous data the data constituted by the sampling values following the adjustment.

Preferably, the phase error information detecting means included in the phase locking means may include slicing means for calculating slice values based on results of comparisons between each of the sampling values constituting the synchronous data and a predetermined threshold; and the phase position determining means included in the phase error information detecting means may determine whether or not the reverse phase condition is in effect, using as the run length limited information transitions of the slice values calculated by the slicing means.

Preferably, d=1 in the RLL recording code recorded on the recording medium; and the phase error information detecting means may detect the phase error information in accordance with a PR(1, −1) equalization algorithm.

Preferably, the value preceding the first value to be processed from among the sampling values constituting the synchronous data may be regarded as the second value. The phase position determining means may determine whether or not the reverse phase condition is in effect, based on a combination of a second slice value corresponding to the second value with a first slice value corresponding to the first value from among the slice values calculated by the slicing means. If the reverse phase condition is not found to be in effect, the phase error information calculating means may calculate the phase error information in accordance with a first operational method using an operation expression given as $$\text{phase\_err} = (\text{data\_now} * \text{slice\_}D) - (\text{data\_}D * \text{slice\_now}).$$

In the expression, data_now stands for the first value, data_D for the second value, slice_now for the first slice value, slice_D for the second slice value, and phase_err for the phase error information. If the reverse phase condition is found to be in effect, the phase error information calculating means may calculate the phase error information in accordance with a second operational method different from the first operational method.

The second operational method may preferably use an operation expression given as $$\text{rev\_phase\_err} = -\text{phase\_err}$$

where, rev_phase_err stands for the phase error information.

Preferably, the second operational method may use an operation expression given as $$\text{rev\_phase\_err} = (\text{reversed sign of phase\_err output}) \times RLEV.$$

In the expression, (reversed sign of phase_err output) stands for a minus sign if phase_err has a plus sign and for a plus sign if phase_err has a minus sign, RLEV denotes a predetermined constant, and rev_phase_err represents the phase error information.

Preferably, RLEV=0 in the operation expression used by the second operational method.

Preferably, d=1 in the RLL recording code recorded on the recording medium; and the phase error information detecting means may detect the phase error information in accordance with a PR(1, 0, −1) equalization algorithm.

Preferably, the value preceding the first value to be processed from among the sampling values constituting the synchronous data may be regarded as the second value, while the value preceding the second value may be regarded as a third value. The phase position determining means may determine whether or not the reverse phase condition is in effect, based on a combination of a third slice value corresponding to the third value, a second slice value corresponding to the second value, and a first slice value corresponding to the first value from among the slice values calculated by the slicing means. If the reverse phase condition is not found to be in effect, the phase error information calculating means may calculate the phase error information in accordance with a first operational method using an operation expression given as $$\text{phase\_err} = (\text{data\_now} * \text{slice\_}D) - (\text{data\_}D * \text{slice\_now}).$$

In the expression, data_now stands for the first value, data_D for the second value, slice_now for the first slice value, slice_D for the second slice value, and phase_err for the phase error information. If the reverse phase condition is found to be in effect, the phase error information calculating means may calculate the phase error information in accordance with a second operational method different from the first operational method.

The second operational method may preferably use operation expressions given as $$\text{phase\_err\_}2D = (\text{data\_now} \times \text{slice\_}D) - (\text{data\_}2D \times \text{slice\_}D)$$

and $$\text{rev\_phase\_err\_}2D = -\text{phase\_err\_}2D.$$

In the expression, data_2D stands for the third value, slice_2D for the third slice value, and rev_phase_err_2D for the phase error information.

Preferably, the second operational method may use operation expressions given as $$\text{phase\_err\_}2D = (\text{data\_now} \times \text{slice\_}D) - (\text{data\_}2D \times \text{slice\_}D)$$

and $$\text{rev\_phase\_err\_}2D = (\text{reversed sign of phase\_err\_}2D \text{ output}) \times RLEV.$$

In the expression, data_2D stands for the third value, slice_2D for the third slice value, and (reversed sign of phase_err_2D output)×RLEV for a minus sign if phase_err_2D has a plus sign and for a plus sign if phase_err_2D has a minus sign; RLEV denotes a predetermined constant, and rev_phase_err_2D represents the phase error information.

Preferably, RLEV=0 in the operation expressions used by the second operational method.

According to a still further embodiment of the present invention, there is provided a data reproducing method for use with a data reproducing apparatus for reproducing data recorded on a recording medium as an RLL recording code where d>0. The data reproducing method includes the steps of: generating a differential response signal with regard to an analog signal read from the recording medium in a manner representing the data; generating asynchronous data by sampling the differential response signal generated in analog form in the differential response signal generating step in asynchronous relation with a predetermined frequency; and generating synchronous data in synchronism with the predetermined frequency from the asynchronous data generated in the sampling step of generating asynchronous data. The synchronous data generating step includes the step of detecting phase error information indicating a phase error in the synchronous data; wherein the phase error information detecting step includes a phase position determining step and a phase error information calculating step. The phase position determining step determines, based on run length limited information, whether or not phase positions of a first value and a second value contiguous to the first value from among sampling values constituting the synchronous data are under a reverse phase condition in effect when only one of the first and the second values is in excess of a predetermined threshold. The phase error information calculating step calculates the phase error information in each of two cases determined, one with the reverse phase condition found to be in effect in the phase position determining step and the other without the reverse phase condition found to be in effect.

According to a yet further embodiment of the present invention, there is provided a second program for causing a computer to execute a procedure including the same steps as those of the inventive data reproducing method outlined above.

Through the use of the phase locking apparatus, phase locking method, and second program according to the present invention, the data recorded on the recording medium as the RLL recording code where d>0 is reproduced. More specifically, a differential response signal is generated with regard to an analog signal read from the recording medium in a manner representing the data. Asynchronous data is generated by sampling the differential response signal generated in analog form in asynchronous relation with a predetermined frequency. Synchronous data is then generated in synchronism with the predetermined frequency from the asynchronous data. That is, the synchronous data is generated on the basis of phase error information indicating a phase error in the synchronous data. The phase error information is calculated as follows: based on run length limited information, it is determined whether or not the phase positions of a first value and a second value contiguous to the first value from among sampling values constituting the synchronous data are under a reverse phase condition in effect when only one of the first and the second values is in excess of a predetermined threshold. The phase error information is then calculated in each of two cases determined, one with the reverse phase condition found to be in effect in the phase position determining step and the other without the reverse phase condition found to be in effect.

As outlined above, the present invention provides a phase locking apparatus or a data reproducing apparatus that includes a phase locking apparatus. In particular, the inventive arrangements contribute to stabilizing the performance of a data reproducing apparatus (system) as a whole including a phase locking apparatus regardless of diverse settings made on the data reproducing apparatus.

BRIEF DESCRIPTION OF THE DRAWINGS

FIG. 12 is a tabular view showing a typical algorithm for use with a typical phase error information detecting device in FIG. 3, where PR(1, −1) equalization is in effect;

FIG. 13 is a tabular view showing an algorithm for use with the phase error information detecting device as part of the embodiment in FIG. 10, where d=1 and PR(1, −1) equalization is in effect;

FIG. 14 is a tabular view showing another algorithm for use with the phase error information detecting device as part of the embodiment in FIG. 10, where d=1 and PR(1, −1) equalization is in effect;

FIG. 15 is a tabular view showing a typical algorithm for use with the typical phase error information detecting device in FIG. 3, where PR(1, 0, −1) equalization is in effect;

FIG. 16 is a tabular view showing an algorithm for use with the phase error information detecting device as part of the embodiment in FIG. 10, where d=1 and PR(1, 0, −1) equalization is in effect;

FIG. 18 is a block diagram showing a structure of a computer constituting part or all of the data reproducing apparatus or phase locking apparatus embodying the present invention.

DETAILED DESCRIPTION OF THE PREFERRED EMBODIMENTS

Figure 1:
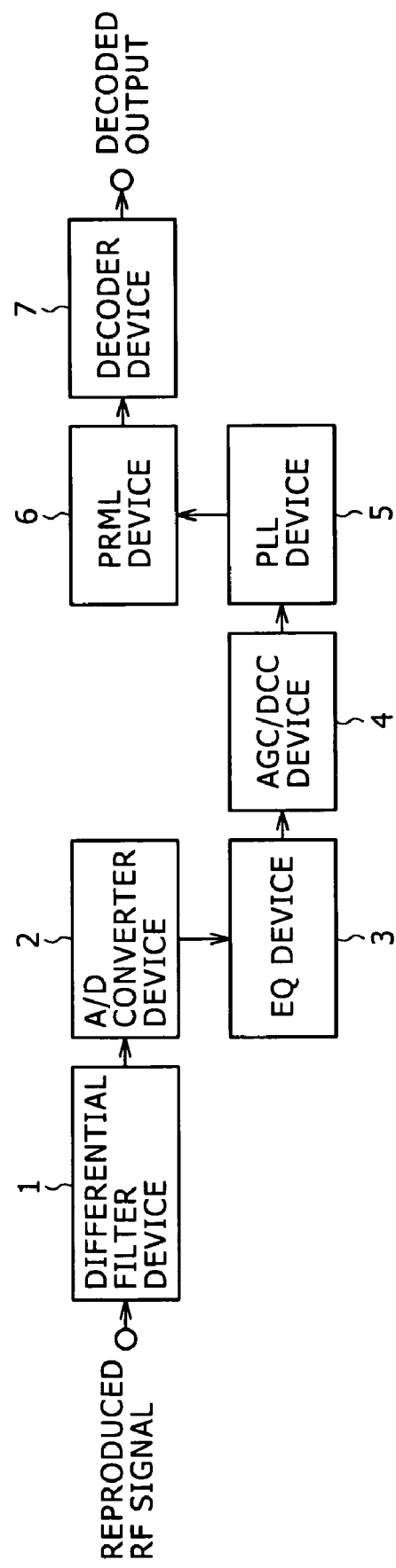
FIG. 1 is a block diagram showing a structure of a data reproducing apparatus practiced as one embodiment of the present invention.

What is described below as the preferred embodiments of the present invention corresponds to the appended claims as follows: the description of the preferred embodiments basically provides specific examples supporting what is claimed. If any example of the invention described below as a preferred embodiment does not have an exactly corresponding claim, this does not means that the example in question has no relevance to the claims. Conversely, if any example of the invention described hereunder has a specifically corresponding claim, this does not mean that the example in question is limited to that claim or has no relevance to other claims.

Furthermore, the description below of the preferred embodiments does not claim to include all examples corresponding to the whole claims. In other words, the description hereunder does not limit or deny any inventive entities which are not covered by the appended claims of the present invention but which may be added or brought about by this applicant in the future by divisional application or by amendment.

One embodiment of the present invention is a phase locking apparatus (e.g., PLL device 5 in FIG. 10) which, when data recorded on a recording medium as an RLL recording code where d>0 is read therefrom as data in asynchronous relation with a predetermined frequency, generates synchronous data in synchronism with the predetermined frequency from the asynchronous data. The phase locking apparatus includes phase error information detecting means (e.g., phase error information detecting device 31 in FIG. 10) to detect phase error information indicating a phase error in the synchronous data. The phase error information detecting means includes: phase position determining means (e.g., phase position determining device 51 in FIG. 10) to determine, based on run length limited information, whether or not phase positions of a first value and a second value contiguous to the first value from among sampling values constituting the synchronous data are under a reverse phase condition in effect when only one of the first and the second values is in excess of a predetermined threshold (e.g., the condition is brought about by the state of FIG. 5 with regard to the state of FIG. 4, as well as by the state of FIG. 7 with regard to the state of FIG. 6). The phase error information detecting means further includes phase error information calculating means (e.g., phase error information calculating device 52 in FIG. 10) to calculate the phase error information in each of two cases determined, one with the reverse phase condition found to be in effect by the phase position determining means and the other without the reverse phase condition found to be in effect.

Preferably, the phase error information detecting means may include a tentatively determined value calculating means (e.g., slicing device 41 in FIG. 10) to calculate these at least two tentatively determined values with regard to these at least two sampling values within the predetermined range; and the phase position determining means may determine whether or not the reverse phase condition is in effect, using as the run length limited information these at least two tentatively determined values calculated by the tentatively determined value calculating means.

Another embodiment of the present invention is a phase locking method for use with a phase locking apparatus. The phase locking method includes the step of detecting (e.g., in the phase error information detecting process of FIG. 11) phase error information indicating a phase error in the synchronous data. The phase error information detecting step includes the step of determining (e.g., in step S23 of FIG. 11), based on run length limited information, whether phase positions of a first value and a second value contiguous to the first value from among sampling values constituting the synchronous data are under a reverse phase condition in effect when only one of the first and the second values is in excess of a predetermined threshold. The phase error information detecting step further includes the step of calculating (e.g., in steps S24 through S26 of FIG. 11) the phase error information in each of two cases determined, one with the reverse phase condition found to be in effect in the phase position determining step and the other without the reverse phase condition found to be in effect.

The present invention further provides a first program corresponding to the above-outlined phase locking method of the present invention, as well as a recording medium on which the first program is recorded. As will be discussed later, the first program may be carried out illustratively by a computer having the structure shown in FIG. 18.

An even further embodiment of the present invention is a data reproducing apparatus (e.g., data reproducing apparatus in FIG. 1) for reproducing data recorded on a recording medium as an RLL recording code where d>0. The data reproducing apparatus includes differentiating means (e.g., differential filter device 1 in FIG. 1) to generate a differential response signal with regard to an analog signal read from the recording medium in a manner representing the data. The data reproducing apparatus further includes sampling means (e.g., A/D converter device 2 in FIG. 1) to generate asynchronous data by sampling the differential response signal generated in analog form by the differentiating means in asynchronous relation with a predetermined frequency. The data reproducing apparatus further includes phase locking means (e.g., PLL device 5 in FIGS. 1 and 10) to generate synchronous data in synchronism with the predetermined frequency from the asynchronous data generated by the sampling means. The phase locking means includes phase error information detecting means (e.g., phase error information detecting device 31 in FIG. 10) to detect phase error information indicating a phase error in the synchronous data; wherein the phase error information detecting means includes phase position determining means (e.g., phase position determining device 51 in FIG. 10) and phase error information calculating means (e.g., phase error information calculating device 52 in FIG. 10). The phase position determining means determines, based on run length limited information, whether or not phase positions of a first value and a second value contiguous to the first value from among sampling values constituting the synchronous data are under a reverse phase condition in effect when only one of the first and the second values is in excess of a predetermined threshold. The phase error information calculating means calculates the phase error information in each of two cases determined, one with the reverse phase condition found to be in effect by the phase position determining means and the other without the reverse phase condition found to be in effect.

Preferably, the data reproducing apparatus of the present invention may further include: waveform shaping means (e.g., EQ device 3 in FIG. 1) to shape into a predetermined waveform the asynchronous data generated by the sampling means in order to output the waveform-shaped asynchronous data; and AGC/DCC means (e.g., AGC/DCC device 4 in FIG. 1) to subject the asynchronous data coming from the waveform shaping means to auto gain control (AGC) and direct current offset cancel (DCC) in order to output the asynchronous data thus processed; wherein the phase locking means may generate the synchronous data from the asynchronous data coming from the AGC/DCC means.

Preferably, the data reproducing apparatus of the present invention may further include: data detecting means (e.g., PRML device 6 in FIG. 1) to detect a channel bit sequence corresponding to the RLL recording code from the synchronous data generated by the phase locking means; and decoding means (e.g., decoder device 7 in FIG. 1) to decode the channel bit sequence detected by the data detecting means.

The phase locking means may preferably include loop filter means (e.g., loop filter device 13 in FIG. 10) to perform a loop filter operation using at least the phase error information detected by the phase error information detecting means in order to output a result of the operation. The phase locking means may further include remainder accumulator means (e.g., remainder accumulator device 14 in FIG. 10) to perform a predetermined cumulative operation on the operation result coming from the loop filter means and, based on a result of the cumulative operation, to generate and output information necessary for adjusting phase positions of sampling values constituting the asynchronous data. The phase locking means may further include phase adjusting means (e.g., interpolating filter device 11 in FIG. 10) to adjust the phase positions of the sampling values constituting the asynchronous data by use of the information output from the remainder accumulator means in order to output as the synchronous data the data constituted by the sampling values following the adjustment.

Preferably, the phase error information detecting means included in the phase locking means may include slicing means (e.g., slicing device 41 in FIG. 10) to calculate slice values based on results of comparisons between each of the sampling values constituting the synchronous data and a predetermined threshold; and the phase position determining means included in the phase error information detecting means may determine whether or not the reverse phase condition is in effect, using as the run length limited information transitions of the slice values calculated by the slicing means.

Figure 2:
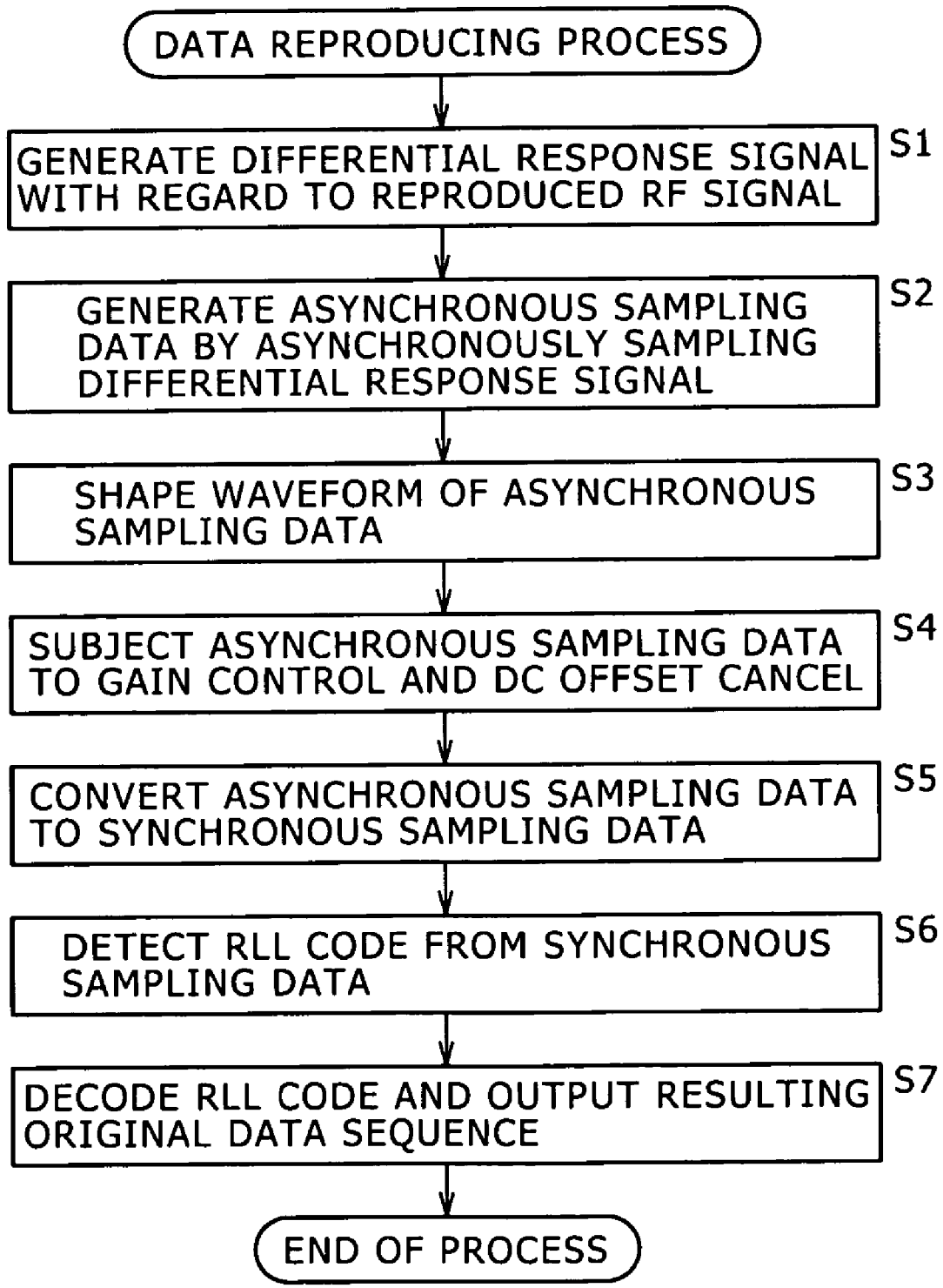
FIG. 2 is a flowchart of steps constituting a data reproducing process performed by the data reproducing apparatus shown in FIG. 1.

A still further embodiment of the present invention is a data reproducing method (e.g., a method corresponding to the data reproducing process in FIG. 2) for use with a data reproducing apparatus. The data reproducing method includes the step of generating (e.g., in step S1 of FIG. 2) a differential response signal with regard to an analog signal read from the recording medium in a manner representing the data. The method further includes the step of generating (e.g., in step S2 of FIG. 2) asynchronous data by sampling the differential response signal generated in analog form in the differential response signal generating step in asynchronous relation with a predetermined frequency. The method yet further includes the step of generating (e.g., in step S4 of FIG. 2) synchronous data in synchronism with the predetermined frequency from the asynchronous data generated in the asynchronous data generating step. The synchronous data generating step includes the step of detecting (e.g., in the phase error information detecting process of FIG. 11) phase error information indicating a phase error in the synchronous data. The phase error information detecting step includes a phase position determining step (e.g., step S23 of FIG. 11) and a phase error information calculating step (e.g., steps S24 through S26 of FIG. 11). The phase position determining step determines, based on run length limited information, whether or not phase positions of a first value and a second value contiguous to the first value from among sampling values constituting the synchronous data are under a reverse phase condition in effect when only one of the first and the second values is in excess of a predetermined threshold. The phase error information calculating step calculates the phase error information in each of two cases determined, one with the reverse phase condition found to be in effect in the phase position determining step and the other without the reverse phase condition found to be in effect.

The present invention also provides a second program corresponding to the above-outlined data reproducing method of the present invention, as well as a recording medium on which the second program is recorded. As will be discussed later, the second program may be carried out illustratively by a computer having the structure shown in FIG. 18.

The preferred embodiments of the present invention will now be discussed in more detail with reference to the accompanying drawings.

FIG. 1 is a block diagram showing a structure of a data reproducing apparatus practiced as one preferred embodiment of the present invention. The data reproducing apparatus may include a phase locking apparatus embodying the invention.

This data reproducing apparatus is designed to reproduce data illustratively from such recording media as magnetic disks, optical disks, or magneto-optical disks.

Before the discussion is started on the data reproducing apparatus shown in FIG. 1, an explanation will be made of the data recorded on the recording medium.

Where data is to be recorded to the recording medium as in the case of the present embodiment or to be sent over a transmission channel, the data is generally modulated to adapt to the recording medium or to the channel in question.

One way of achieving such data modulation is by adopting the scheme known as block coding. Block coding involves turning a data sequence into blocks of m×i bits each (called data words) and converting the data words into code words of n×i bits each in accordance with an appropriate coding rule. The code has a fixed length when i=1. If the value "i" is allowed to take any one of a plurality of values, i.e., if the value "i" is selected between 1 and a value "imax" (i.e., maximum i) for code word conversion, the code has a variable length. The block code is then expressed as a variable length code (d, k; m, n; r). In the ensuing description, the variable length code (d, k; m, n; r) will be called the RLL code (Run Length Limited Code) where appropriate.

The value "i" denotes a limited length. Reference character "r" stands for imax, or a maximum limited length. Reference character "d" denotes a minimum number of continuous 0's that occur between continuous 1's, e.g., a minimum run length of 0's. Reference character "k" represents a maximum number of continuous 0's that occur between continuous 1's, e.g., a maximum run length of 0's.

More specifically, where the minimum reverse interval of a recorded waveform sequence, that is, RLL code having undergone NRZI modulation, to be discussed later, is represented by Tmin and the maximum reverse interval of the sequence by Tmax, the following conditions are known to exist: if it is desired to have high density recording in the direction of linear velocity, the minimum reverse interval Tmin should be made long, that is, "d" should be large; in view of clock reproduction, the maximum reverse interval Tmax should be made short, that is, maximum run length "k" should be small. Various modulation methods have been proposed to find an optimum trade-off between these conditions.

Specific modulation methods proposed or actually put to use on optical disks, magnetic-disks or magneto-optical disks include: variable length coding RLL(1-7) (also known as (1, 7; m, n; r)), variable length coding RLL(2-7) (also known as (2, 7; m, n; r)), and fixed length coding RLL(1-7) (also known as (1, 7; m, n; 1) for use with the ISO Standard compliant MO).

The RLL code scheme where d=1 is widely adopted for disk apparatus handling high recording density optical disks or magneto-optical disks currently under research and development. An example of this scheme is the variable length RLL(1-7) coding.

The parameters of the variable length RLL(1-7) are (1, 7; 2, 3; 2). If the bit interval of a recorded waveform sequence is represented by T, then a minimum reverse interval Tmin given as (d+1)T is expressed as 2 (=1+1)T. If the bit interval of a data sequence is represented by Tdata, then a minimum reverse interval Tmin given as (m/n)×2 is expressed as 1.33 (=(⅔)×2) Tdata. A maximum reverse interval Tmax given as (k+1) T is expressed as 8 (=7+1) T ((=(m/n)×8Tdata=(⅔)× 8Tdata=5.33Tdata). A detection window width Tw is defined as (m/n)×Tdata and is expressed numerically as 0.67 (=⅔) Tdata.

Checks on the frequency with which T occurs in channel bit sequences modulated by RLL(1-7) show that 2T at Tmin occurs most frequently, followed by 3T, 4T and 5T, in that order. Edge information generated at shorter intervals such as 2T or 3T often proves to be more advantageous for clock reproduction.

The 17PP code adopted for the Blu-ray Disc ReWritable Format is based on the RLL(1-7) code. The minimum run length, maximum run length, and basic conversion rate of the 17PP code are the same as those of the RLL(1-7) code. The continuations of the minimum run length 2T are limited to a finite number of times. The relations between a data sequence and the converted code sequence derived therefrom are arranged in such a manner that the numbers of 1's in the table have a regularity for efficient conversion under DSV (digital sum value) control.

What follows is an explanation of the DSV control.

Where data is to be recorded to a recording medium or sent over a transmission channel, the data is subjected to coded modulation adapted to the recording medium or the transmission channel in question. A DC component or a low-pass component contained in the modulated code will likely trigger jitters or deviations in various error detection signals resulting in a tracking error or other irregularities during servo control of a disk apparatus. It is thus preferred that such DC and low-pass components be minimized in the modulated code.

A method for controlling DSV has therefore been proposed. The DSV control involves having the RLL code level-coded (e.g., through NRZI modulation, to be described later) and adding signs to the resulting bit sequence (data symbols) by turning 1's into +1's and 0's into −1's therein so that the sum total of the addition will approach zero. Carrying out the DSV control, i.e., minimizing the absolute value of DSV transitions serving as a measure of any DC component and low-pass component in a code sequence, translates into reducing the DC and low-pass components in that code sequence.

The modulated code based on the variable length RLL(1-7) is not subject to DSV control. Because of its high efficiency of conversion, this modulated code may not be placed under DSV control at modulation time as in the case of the eight-sixteen modulation for DVD (digital versatile disk). In such a case, the DSV control is accomplished when a coded sequence (i.e., channel bit sequence) derived from the modulation is delimited at predetermined intervals for DSV calculations so that the resulting DSV control bits are inserted where appropriate in that coded sequence.

However, the DVD control bits are basically redundant bits. For that reason, there should be as few DVD control bits as possible with a view to keeping code conversion efficient.

Where the present invention is practiced, the RLL code is recorded to the recording medium as described above.

To be more exact, where the RLL code is recorded to the recording medium such as an optical disk or an magneto-optical disk medium, for example, a compact disc or a Mini disc, NRZI (Non Return to Zero Inverted) modulation is often carried out whereby 1's are inverted and 0's are not inverted in the RLL code. Thus data is recorded using the NRZI-modulated variable length code (also called the recorded waveform sequence). In some cases of earlier magneto-optical disks at low recording densities pursuant to the relevant ISO (International Organization for Standardization) standards, the bit sequence modulated for recording was recorded without undergoing NRZI modulation.

With this embodiment, as described, the RLL code (called the RLL recording code hereunder) recorded on such recording media as optical disks or magneto-optical disks is reproduced by the data reproducing apparatus shown in FIG. 1. Furthermore, the RLL recording code where d>0 is reproduced by the data reproducing apparatus in FIG. 1.

Illustratively, the RLL recording code recorded on the recording medium is retrieved therefrom by a head or like device, not shown, as an RF (radio frequency) signal (called the reproduced RF signal hereunder). The reproduced RF signal is input to the data reproducing apparatus of FIG. 1.

The data reproducing apparatus of FIG. 1 reconstructs the original data from the reproduced RF signal thus input and outputs the reconstructed data. These functions are implemented by a group of devices ranging from a differential filter device 1 to a decoder device 7 making up the data reproducing apparatus shown in FIG. 1.

FIG. 2 is a flowchart of steps constituting a typical data reproducing process carried out by the data reproducing apparatus structured as described above. How the data reproducing process is performed by the data reproducing apparatus of FIG. 1 will now be discussed by referring to FIG. 2. In describing what takes place in each step in the flowchart of FIG. 2, that device or those devices from among the differential filter device 1 through the decoder device 7 which correspond to the step in question will also be explained.

In step S1, the differential filter device 1 generates a differential response signal with regard to the reproduced RF signal and supplies the generated signal to an A/D converter device 2. As its name implies, the differential filter device 1 is illustratively composed of a differentiation type filter.

In step S2, the A/D (analog/digital) converter device 2 generates digital asynchronous sampling data by asynchronously sampling the differential response signal in analog form at a predetermined sampling frequency not in synchronism with a target channel clock (i.e., write frequency) fch. The digital asynchronous sampling data thus generated is supplied to an equalizing (EQ) device 3.

Preferably, the sampling frequency used in step S2 may be set to be a little higher than the channel clock fch and lower than twice the clock fch. Illustratively, the sampling frequency of this embodiment is set for n/m times the channel clock fch where m=7 and n=8, or fch*8/7. That is, the sampling frequency is at 8/7 times the channel clock fch.

In step S3, the EQ device 3 shapes into a predetermined waveform the asynchronous sampling data supplied from the A/D converter device 2. With this embodiment, the EQ device 3 is constituted illustratively by an equalizer that has constants fixed at 5 taps. Using each of these constants, the equalizer shapes the asynchronous sampling data into the predetermined waveform.

After the asynchronous sampling data suitably shaped in its waveform is forwarded from the EQ device 3 to an AGC/DCC device 4, step S4 is reached. In step S4, the AGC/DCC device 4 subjects the asynchronous sampling data to auto gain control (AGC) and direct current offset cancel (DCC).

The AGC/DCC device 4 may acquire necessary information from some other block and operate on the obtained information as needed.

After the asynchronous sampling data having undergone auto gain control and DC offset cancel is sent from the AGC/DCC device 4 to a PLL device 5, step S5 is reached. In step S5, the PLL (phase locked loop) device 5 converts the asynchronous sampling data into synchronous sampling data that is synchronized with the channel clock fch.

As will be discussed later in more detail, the PLL device 5 has an algorithm capable of PR(1, −1) equalization or PR(1, 0, −1) equalization. As a result, the synchronous sampling data output from the PLL device 5 constitutes a digital signal shaped in waveform through PR(1, −1) equalization or PR(1, 0, −1) equalization.

After the synchronous sampling data is supplied from the PLL device 5 to a PRML device 6, step S6 is reached. In step S6, the PRML device 6 detects an RLL code (channel bits of 0's or 1's) from the synchronous sampling data through the use of the PRML (partial response maximum likelihood)

technique that combines partial response (PR) with maximum likelihood sequence detection (ML).

For maximum likelihood decoding, the Viterbi detection (Viterbi decoding) technique is primarily utilized. However, the data detecting technique of the PRML device 6 is not limited to Viterbi decoding. Alternatively, a technique based on the NPLM code may be used. As another alternative, the simple slicing detection technique may be employed.

After the RLL code is sent from the PRML device 6 to the decoder device 7, step S7 is reached. In step S7, the decoder device 7 decodes the RLL code (through channel decoding=coded demodulation) and outputs the original data sequence obtained through the decoding.

The foregoing has been the description of the data reproducing process carried out by the data reproducing apparatus having the structure shown in FIG. 1.

Figure 3:
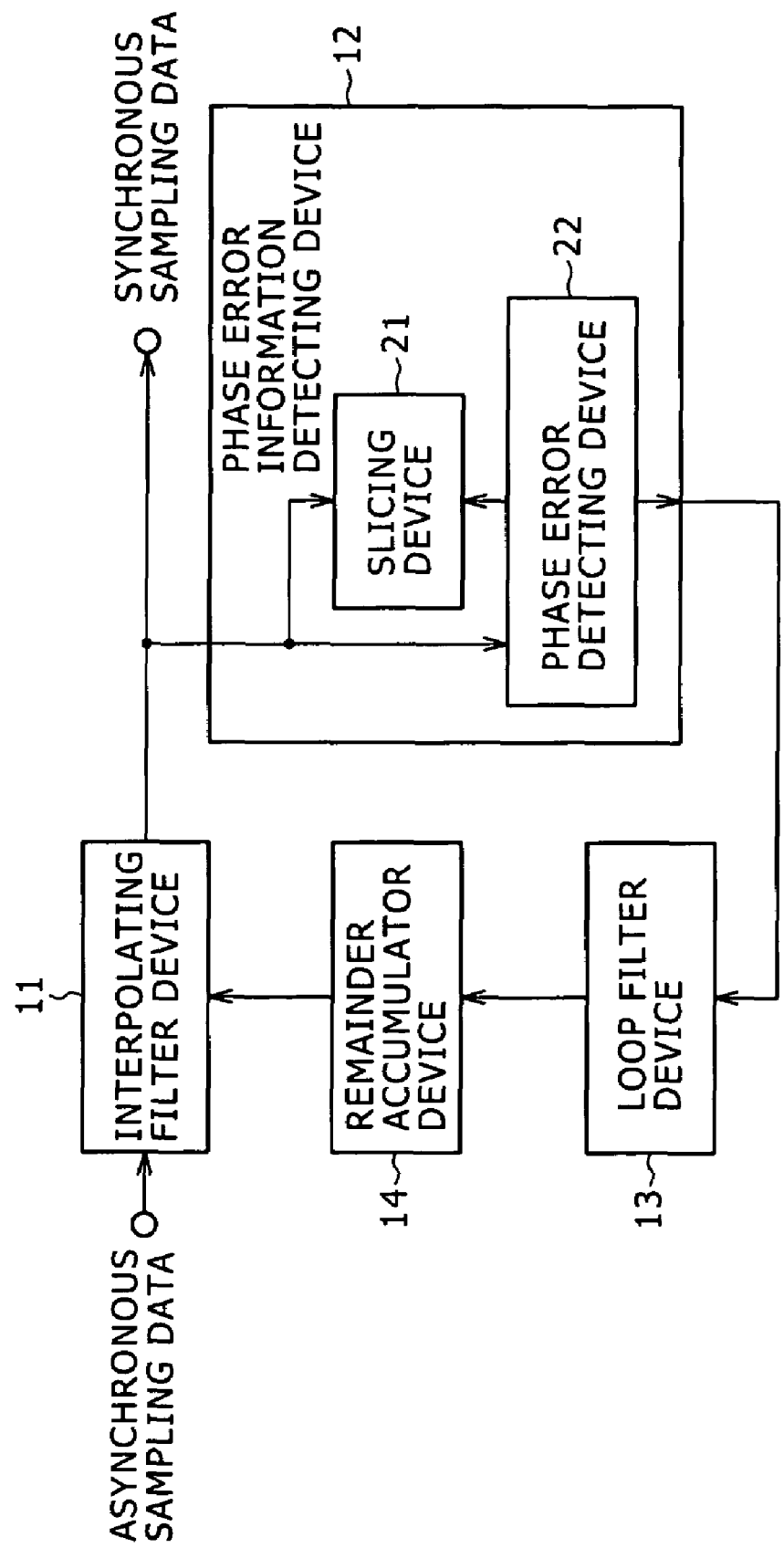
FIG. 3 is a block diagram showing a structure of a typical digital ITR type PLL setup.
Figure 10:
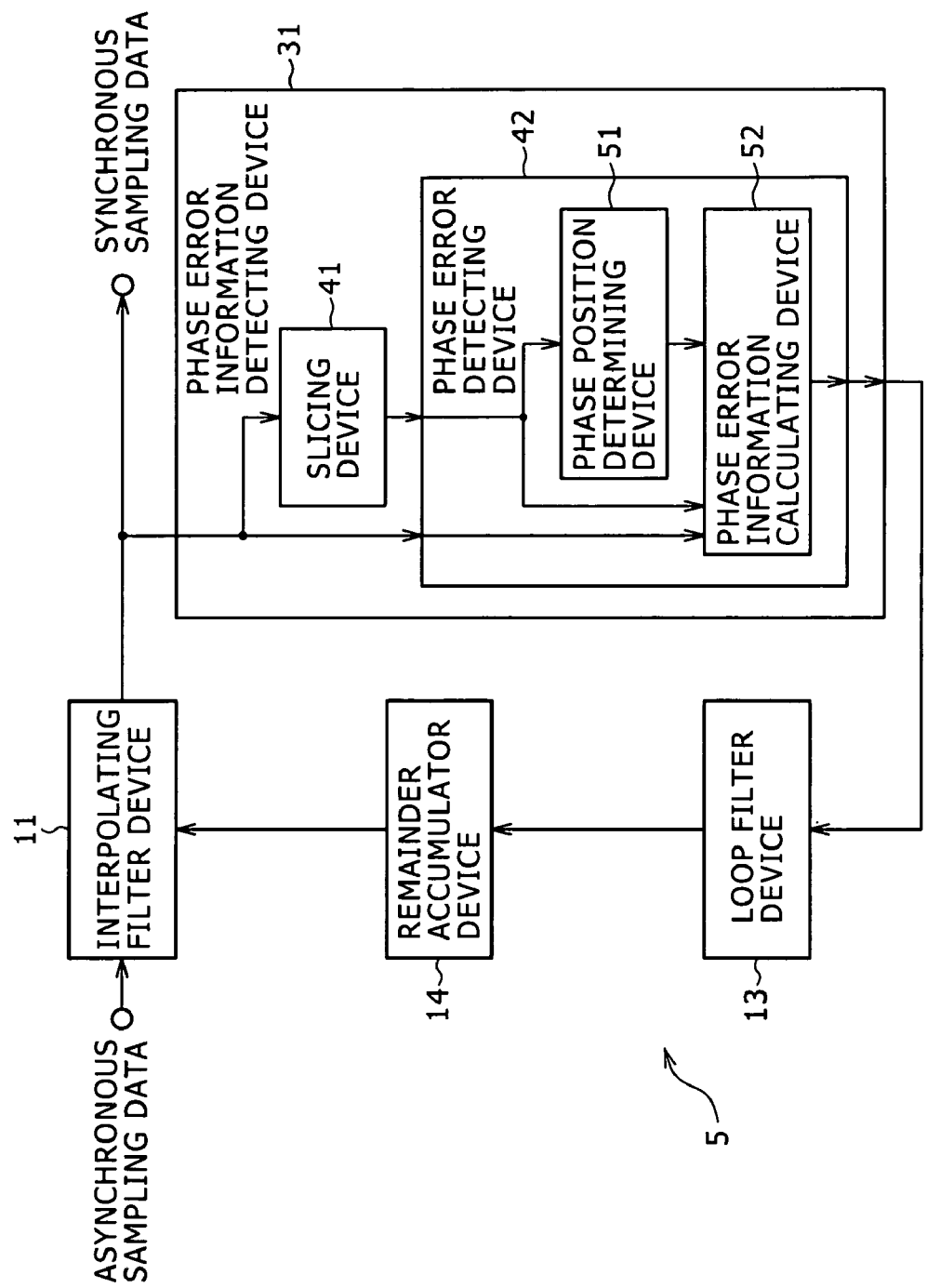
FIG. 10 is a block diagram showing a structure of a phase locking apparatus practiced as another embodiment of the present invention, the apparatus constituting the PLL device incorporated in the data reproducing apparatus of FIG. 1.

Meanwhile, as opposed to the data reproducing apparatus structured as indicated in FIG. 1, a reproducing apparatus may be envisaged which incorporates a traditional PLL device such as one shown in FIG. 3 in place of the inventive PLL device 5 (whose detailed structure is shown in FIG. 10). FIG. 3 shows a structure of the typical PLL setup.

In the setup of FIG. 3, the traditional PLL device is structured as a digital ITR type PLL circuit. The PLL device in FIG. 3 is thus arranged to contain devices ranging from an interpolating filter device 11 to a remainder accumulator device 14.

The interpolating filter device 11 is provided as an interpolating filter that has a plurality of filter coefficients for converting the asynchronous sampling data input from the AGC/DCC device 4 in FIG. 1 into synchronous sampling data. More specifically, based on the information fed from the remainder accumulator device 14, the interpolating filter device 11 selects one of the filter coefficients and shifts the phase of the asynchronous sampling data by the amount corresponding to the selected filter coefficient. As a result, the sampling data output from the interpolating filter device 11 approaches the synchronous sampling data.

In other words, during a period of transition, the sampling data output from the interpolating filter device 11 is not yet synchronized accurately with the channel frequency fch. There is a phase error in the sampling data coming from the interpolating filter device 11. The phase error is brought infinitely close to zero by the PLL device carrying out feedback control. The process of feedback control results in the output of the sampling data that is approximately in synchronism with the channel frequency fch. Such feedback control is accomplished by a phase error information detecting device 12, a loop filter device 13, and a remainder accumulator device 14 installed in addition to the interpolating filter device 11. That is, the series of devices ranging from the interpolating filter device 11 to the remainder accumulator device 14 constitute a feedback loop.

In the ensuing description, all sampling data output from the interpolating filter device 11 will be called the synchronous sampling data. In other words, the sampling data containing more or less the phase error is still called the synchronous sampling data.

The phase error information detecting device 12 is furnished with an algorithm illustratively capable of PR(1, −1) equalization. In operation, the phase error information detecting device 12 detects information indicative of the phase error in the synchronous sampling data (called the phase error information hereunder) and forwards the detected information to the loop filter device 13. More specifically, the phase error information detecting device 12 is made up of a slicing device 21 and a phase error detecting device 22.

In the description that follows, a notation "data_now" denotes the sampling value to be currently processed, i.e., the synchronous sampling data from which the phase error information detecting device 12 is about to detect a phase error. A notation "data_D" represents the synchronous sampling data preceding the sampling data denoted by "data_now."

The slicing device 21 compares the actual value "data_now" with a predetermined threshold "th" so as to determine tentatively the value that should intrinsically be taken by the data "data_now." The tentatively determined value (called the slice value hereunder) is sent to the phase error detecting device 22.

Illustratively, because the synchronous sampling data is turned into be a digital signal shaped in waveform through PR(1, −1) equalization, values "1," "0," and "−1" are the values that the data "data_now" can intrinsically take. Thus the sliding device 21 of this embodiment checks to see if the data "data_now" satisfies one of the following three inequalities:

$$\text{data\_now} \geq th \tag{1}$$

$$th > \text{data\_now} > -th \tag{2}$$

$$-th \geq \text{data\_now} \tag{3}$$

The slicing device 21 determines that the slice value is "1" if the inequality (1) is met, that the slice value is "0" if the inequality (2) is met, or that the slice value is "−1" if the inequality (3). The slicing device 21 supplies the slice value thus determined to the phase error detecting device 22.

The phase error detecting device 22 detects a value "phase_err" as phase error information by calculating the right side of Mueller & Mueller's equation (4) shown below and sends the detected value to the loop filter device 13. The equation is:

$$\text{phase\_err} = (\text{data\_now} * \text{slice\_D}) - (\text{data\_D} * \text{slice\_now}) \tag{4}$$

where, "slice_now" stands for the slice value corresponding to "data_now," and "slice_D" for the slice value corresponding "data_D."

The loop filter device 13 performs a loop filter operation using a predetermined loop filter coefficient and a suitable predetermined initial value in addition to the phase error information coming from the phase error detecting device 22. The result of the operation is sent to the remainder accumulator device 14.

The remainder accumulator device 14 carries out an accumulating operation on the result of the loop filter operation performed by the loop filter device 13. Based on the result of the accumulating operation, the remainder accumulator device 14 generates information needed by the interpolating filter device 11, provides the device 11 with the generated information, and offers enable information need by any other block.

The traditional PLL setup structured as described above is liable to incur the previously experienced problem mentioned earlier. The inventors of the present invention isolated the primary cause of the problem and have come up with a technique for eliminating the cause.

Figure 4:
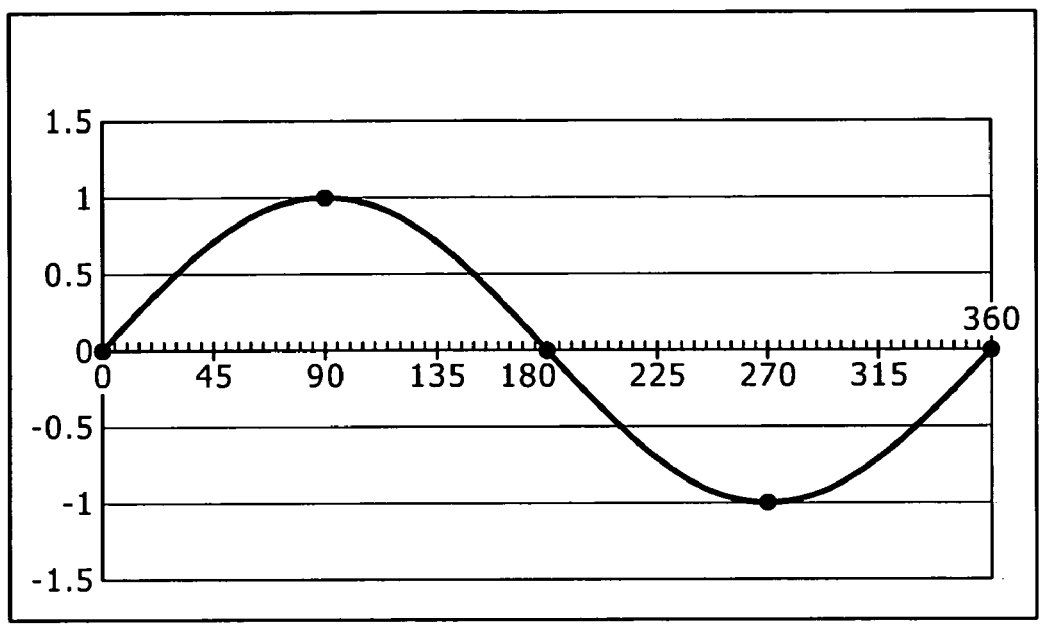
FIG. 4 is a graphic representation of a model for explaining a reverse phase condition.

The primary cause of the previously experienced problem is explained below by referring to FIGS. 4 through 9. FIG. 4 is a graphic representation of an ideal output waveform in effect when the minimum run length 2T (=d+1) continues following PR(1, −1) equalization through the use of the RLL recording code where d=1.

More specifically, the output during the continuation of 2T derived from PR(1, −1) equalization by use of the RLL recording code where d=1 is 1, 0, −1, 0, 1, 0, −1, etc. The resulting output waveform is a simple sinusoidal wave such as one shown in FIG. 4.

In that case, the ideal sampling positions for PR(1, −1) equalization by the PLL device, i.e., ideal phase positions (where no phase error exists) of the synchronous sampling data from the interpolating filter device 11 (in other words, ideal phase positions of "data_now" and "data_D") are the phase positions at 0, 90, 180, 270 and 360 as indicated in FIG. 4.

When the synchronous sampling data having such ideal phase positions is output from the interpolating filter device 11, it may be assumed that a value "0.5" is set as the threshold "th" for use by the slicing device 12, i.e., as the threshold "th" used in the inequalities (1) through (3) above. In such a case, the combination of "slice_D" with "slice_now" (slice_D, slice_now) is any one of (0, −1), (0, 1), (1, 0) and (−1, 0). Thus "phase_err" is always "0" as can be seen from the equation (4) above. That is, the phase error detecting device 22 outputs "0" (which means there is no phase error) as the phase error information to the loop filter device 13. In other words, the phase error detecting device 22 inhibits the output of phase error information.

However, it should be noted that "phase_err" takes on a value other than "0" and the phase error information is output if the synchronous sampling data in the phase positions of 0, 90, 180, 270, 360 contains any value stemming from noise or other irregularities, i.e., if any value in the position at 0, 90, 180, 270 or 360 is "0," "1" or "−1" supplemented by a value caused principally by noise.

If the phase positions of the synchronous sampling data coming from the interpolating filter device 11 are slightly out of phase with the ideal positions (at 0, 90, 180, 270 and 360), the combination (slice_D, slice_now) is also any one of (0, −1), (0, 1), (1, 0) and (−1, 0). In that case, "phase_err" takes on a value other than "0" and the phase error information is output even if there is no noise or any other irregularity.

It follows that if the phase positions of the synchronous sampling data sent from the interpolating filter device 11 are a little out of phase with the ideal positions (at 0, 90, 180, 270 and 360), the above-described feedback control effected by the PLL device causes the phase positions to converge on these ideal positions. That is, the phase error is removed from the synchronous sampling data supplied from the interpolating filter device 11.

Figure 5:
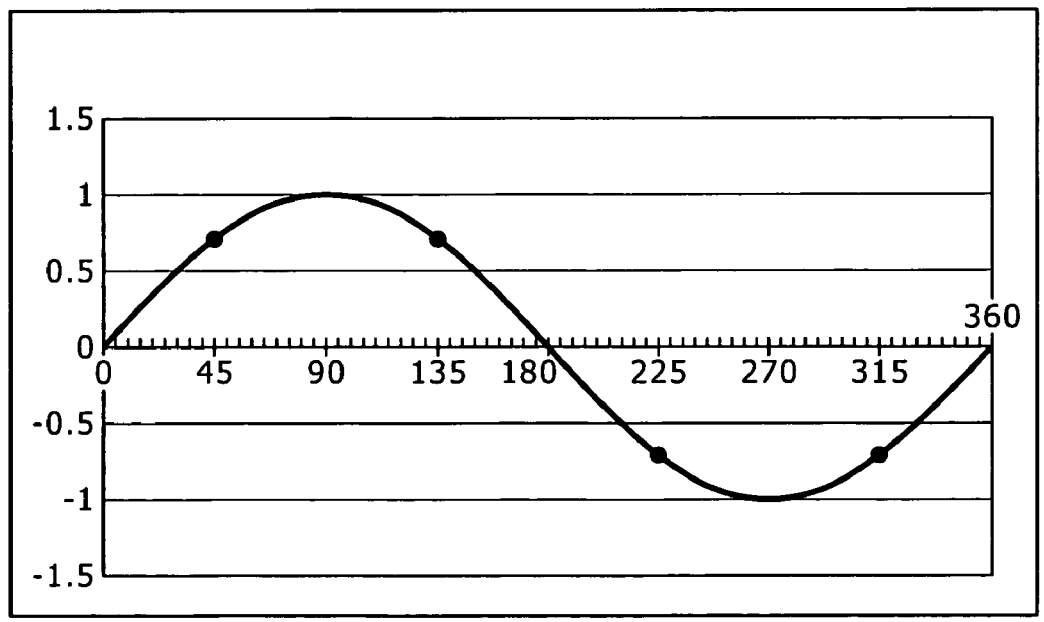
FIG. 5 is a graphic representation of another model for explaining the reverse phase condition.

However, if the phase positions of the synchronous sampling data from the interpolating filter device 11 (i.e., phase positions of "data_now" and "data_D") become out of phase by as much as 45 with the ideal positions (at 0, 90, 180, 270 and 360) as shown in FIG. 5, then the combination (slice_D, slice_now) is none of (0, −1), (0, 1), (1, 0) and (−1, 0). Instead, combinations (1, −1), (1, 1), (−1, 1) and (−1, −1) can occur which should not take place when the RLL code where d=1 is applied to PR(1, −1) equalization. As a result, "phase_err" is always "0" as can be seen from the equation (4) above. That is, despite the presence of the phase error of up to 45, the phase error detecting device 22 outputs "0" (which means the absence of the phase error) as the phase error information to the loop filter device 13.

In FIG. 5, if any value in the phase positions at 45, 135, 225 and 315 in the synchronous sampling data is smaller than th=0.5 or larger than −th=−0.5, then the combination (slice_D, slice_now) is one of (0, −1), (0, 1), (1, 0) and (−1, 0). This results in the output of phase error information. However, as is evident from FIG. 5, the values in the phase positions at 45 and 135 are much larger than th=0.5 and the values in the phase positions at 225 and 315 are much smaller than −th=−0.5. Even if the synchronous sampling data contains a large amount of noise, there is only a low probability of the noise-triggered values getting below th=0.5 or exceeding −th=−0.5.

In the end, where the phase positions of the synchronous sampling data forwarded from the interpolating filter device 11 are slightly off the positions which in turn are out of phase with the ideal positions by 45 (i.e., positions at 45, 135, 225, 315 and 405), the feedback control executed by the PLL device causes the phase positions to converge on the positions out of phase by 45 with the ideal positions (i.e., positions at 45, 135, 225, 315 and 405). That is, the phase error in the synchronous sampling error from the interpolating filter device 11 remains approximately at 45 and will not disappear.

To be more exact, what happens here is as follows: where the phase positions of "data_D" and "data_now" are such that the value of either "data_D" or "data_now" is in excess of a predetermined threshold, these phase positions are said to constitute the reverse phase. Under the reverse phase condition, the feedback control performed by the PLL device causes the phase positions to converge on the positions out of phase by 45 with the ideal positions (i.e., positions at 45, 135, 225, 315 and 405). As a result, the phase error in the synchronous sampling error from the interpolating filter device 11 stays approximately at 45 and is always present.

Figure 6:
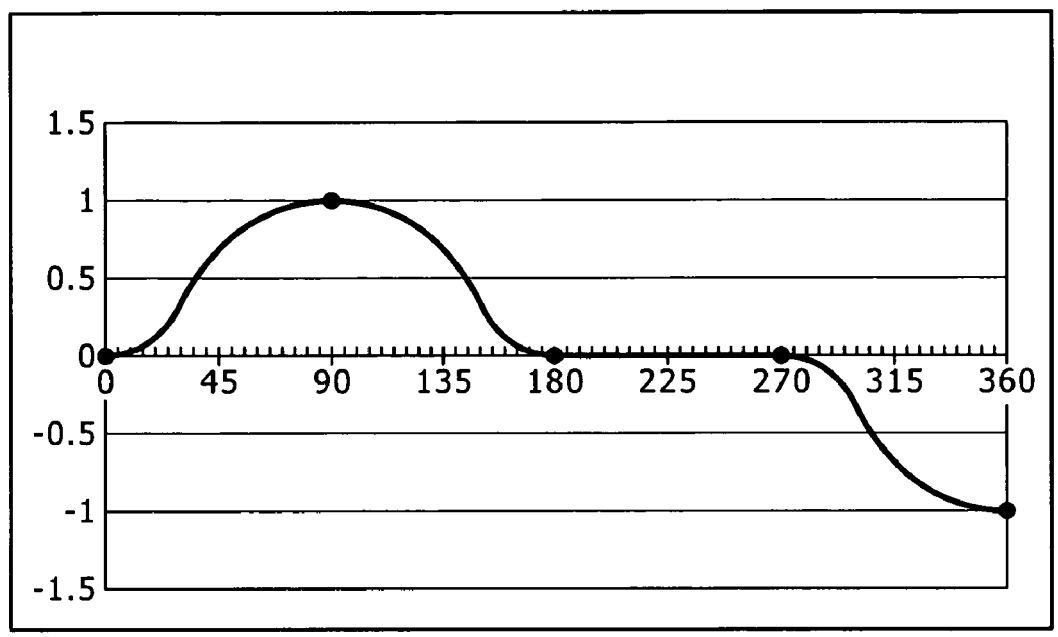
FIG. 6 is a graphic representation of another model for explaining the reverse phase condition.
Figure 7:
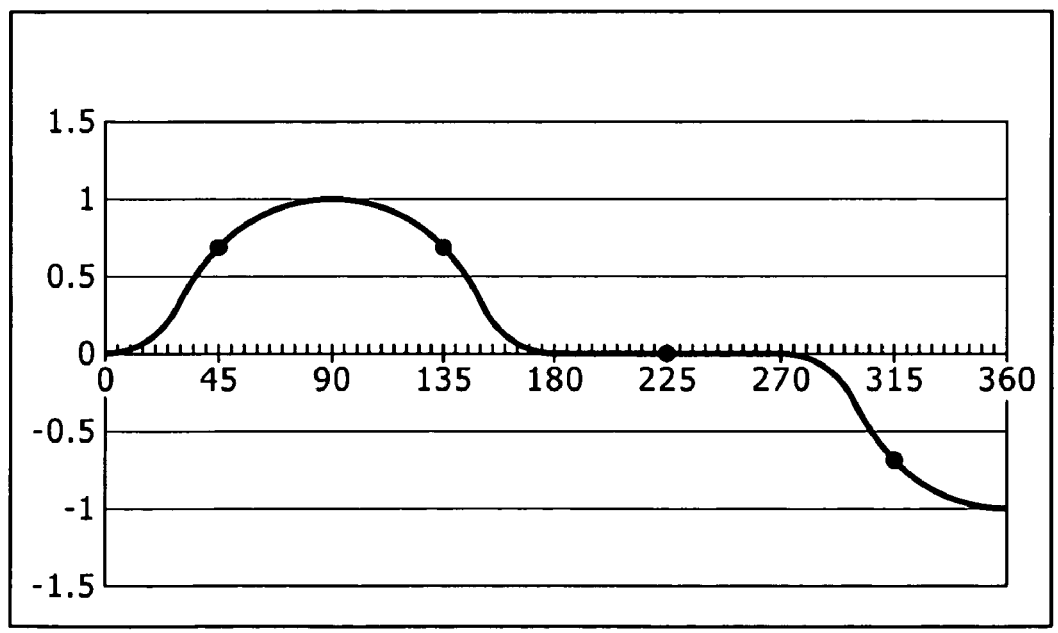
FIG. 7 is a graphic representation of another model for explaining the reverse phase condition.

The operations discussed above also apply where the minimum run length of other than 2T continues. For example, if the minimum run length of 3T continues following PR(1, −1) equalization using the RLL recording code where d=1, the output is 0, 1, 0, 0, −1, 0, 0, 1, 0, 0, −1, 0, 0, etc. Thus the output waveform appears something like what is shown in FIG. 6. FIG. 6 shows a state in which the phase positions of the synchronous sampling data from the interpolating filter device 11 are in the ideal positions (i.e., positions at 0, 90, 180, 270 and 360). By contrast, FIG. 7 shows a state where the phase positions of the synchronous sampling data from the interpolating filter device 11 are out of phase by 45 from the ideal positions.

As is evident from FIG. 6, even during an output with the minimum run length of 3T continued, if the phase positions of the synchronous sampling data coming from the interpolating filter device 11 are in the ideal positions (i.e., positions at 0, 90, 180, 270 and 360), then the combination (slice_D, slice_now) is one of (0, −1), (0, 1), (1, 0) and (−1, 0). On the other hand, if the phase positions of the synchronous sampling data sent from the interpolating filter device 11 are out of phase by 45 with the ideal positions, the combination (slice_D, slice_now) is one of (1, 1) and (−1, −1) which should never happen, with values (0, −1), (0, 1), (1, 0) and (−1, 0) occurring under an out-of-phase condition.

Although not shown, the output is 1, 0, 0, 0, −1, 0, etc., if the minimum run length of 4T continues; the output is 1, 0, 0, 0, 0, −1, 0, etc., if the minimum run length of 5T continues; or the output is 1, 0, 0, 0, 0, 0, −1, 0, etc., if the minimum run length of 6T continues. Illustratively, if RLL(1, 7) is in effect, then d=1 and the maximum run length k=7, which means that 2T through 8T exist. In practice, however, still larger T's can occur (e.g., 10T) because of the effect of sync code.

In any case, if the phase positions of the synchronous sampling data supplied from the interpolating filter device 11 are in the ideal positions regardless of the minimum run length, then the combination (slice_D, slice_now) is one of (0, −1), (0, 1), (1, 0) and (−1, 0). By contrast, if the phase positions of the synchronous sampling data from the interpolating filter device 11 are out of phase by 45 with the ideal positions, the combination (slice_D, slice_now) is one of (1, 1) and (−1, −1) which should not occur, with values (0, −1), (0, 1), (1, 0) and (−1, 0) appearing under an out-of-phase condition.

As a result, if the phase positions of the synchronous sampling data coming from the interpolating filter device 11 are under the reverse phase condition, the above-described feedback control by the PLL device causes the phase positions to emerge in positions that are out of phase with the ideal positions. The phase error in the synchronous sampling data from the interpolating filter device 11 thus persists. This is thought to be the principal cause of the problem discussed earlier.

Figure 8:
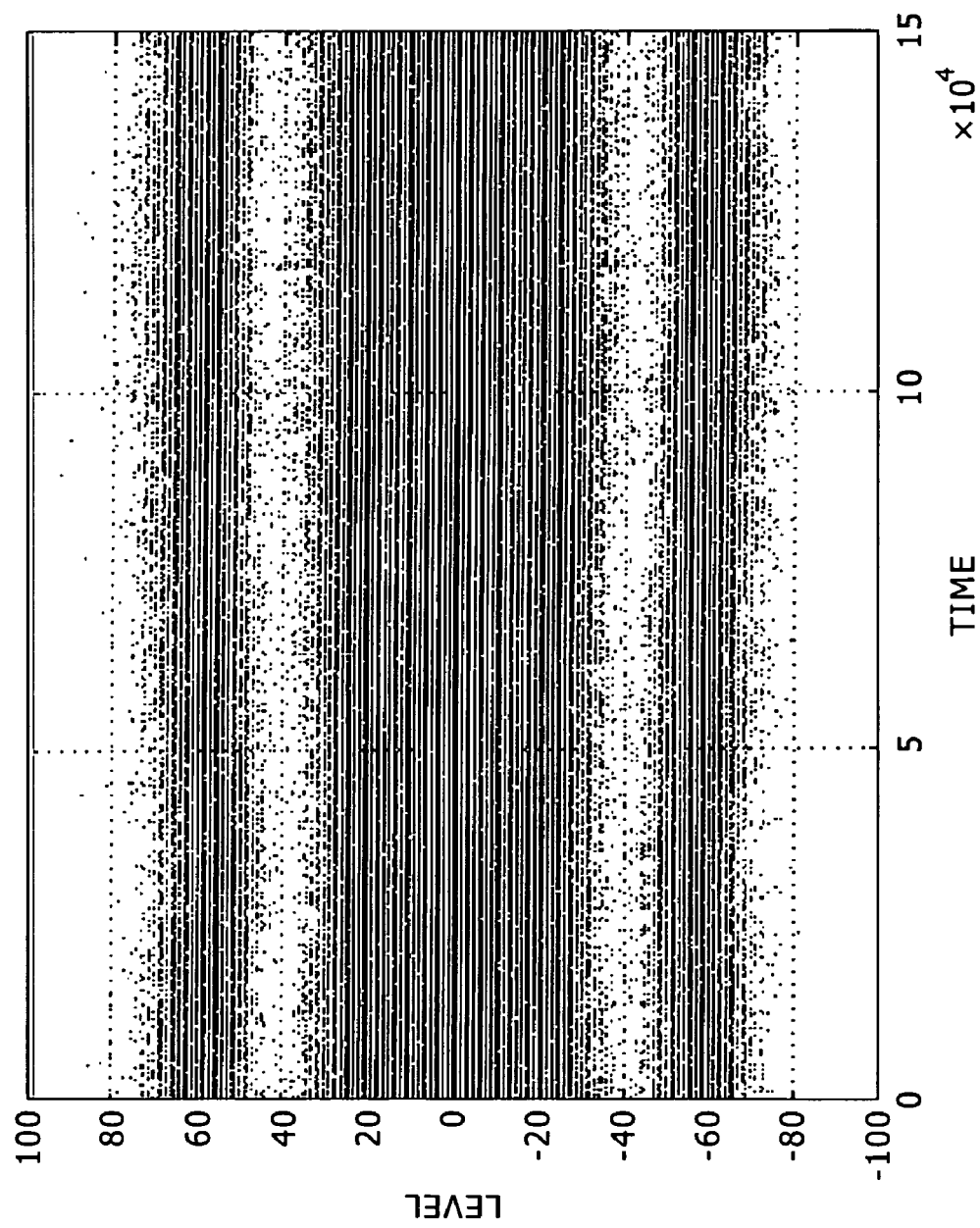
FIG. 8 is a waveform chart indicative of a state in which the typical PLL setup of FIG. 3 is locked.

Illustratively, FIG. 8 shows a state where a typical PLL setup is normally locked, i.e., where the phase positions of the synchronous sampling data supplied from the interpolating filter device 11 are substantially in ideal positions. That is, FIG. 8 illustrates synchronous sampling data normally obtained by the classic PLL setup phase-synchronizing asynchronous sampling data through PLL(1, −1) equalization. In FIG. 8, the horizontal axis denotes time and the vertical axis represents amplitude levels. The threshold "th" is 32 [level], with (−0.50, 0.25, 1.50, 0.25, −0.50) given as five taps applicable to the upstream EQ device 3 in FIG. 1. The error rate in effect when a so-called "eye" pattern emerges is about 3e-4 in bytes. As shown in FIG. 8, the presence of eyes (i.e., each an opening near the threshold and between two dark portions) indicates that the phase positions of the synchronous sampling data converge substantially on the ideal positions even if the actual waveform contains interference.

Figure 9:
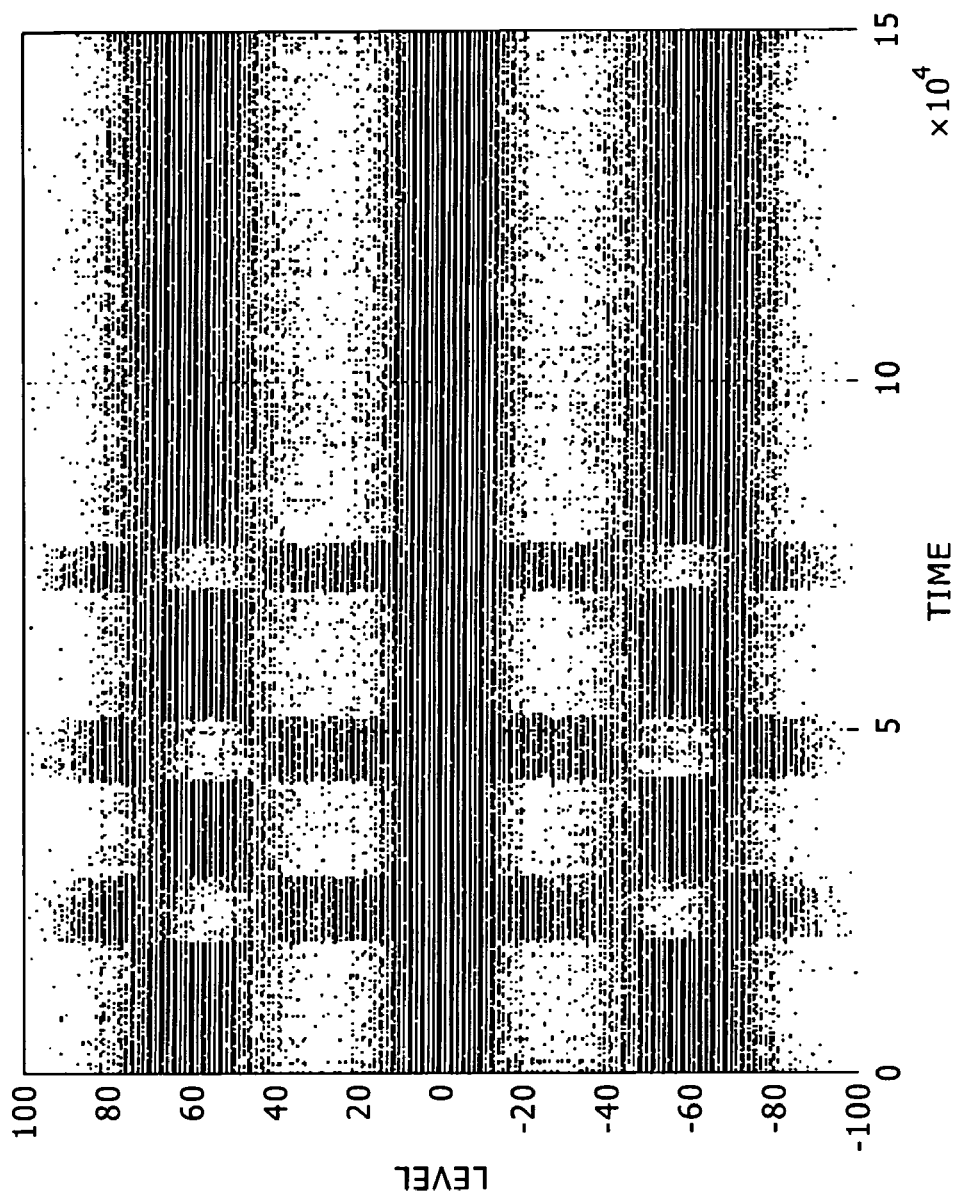
FIG. 9 is a waveform chart indicative of a state in which the typical PLL setup of FIG. 3 is locked onto positions under the reverse phase condition.

But if the phase positions of the synchronous sampling data coming from the interpolating filter device 11 are under the reverse phase condition, the classic PLL setup locks onto some of these positions (i.e., out of phase by 45 from ideal positions). As a result, the asynchronous sampling data appears as shown in FIG. 9 in which the eye pattern breaks down. In other words, at some levels, although the eyes stemming from the normally executed PR(1, −1) equalization are still in shape (like the eyes around ±60 [level]), the other eyes (like the eyes around ±30 [level]) resemble those resulting from another type of PR equalization (i.e., PR(1, 0, −1) equalization). That is, if the classic PLL setup locks onto some phase positions under the reverse phase conditions (e.g., positions out of phase by 45 from ideal positions), the performance of the PLL is equivalent to proceeding with another type of PR equalization (PR(1, 0, −1) equalization).

Whereas the error rate in the eye portions with PR(1, −1) equalization normally carried out is about the same as in the case of FIG. 8 (i.e., the error rate is fairly good), the classic PLL setup locking onto some phase positions under the reverse phase condition entailing a breakdown of the eye pattern can result in an overall inconsistency of, or the unavailability of SYNC (leading edge) in, the channel bits detected by the downstream PRML device 6 corresponding to PR(1, −1) shown in FIG. 1. This leads to the total inability to acquire the error rate, which gives rise to the previously encountered problem.

The phenomenon of the typical PLL setup locking onto positions under the reverse phase condition can occur depending on the AGC or DCC settings of the AGC/DCC device 4 located upstream of the PLL device in FIG. 1, on the tap settings of the EQ device 3, or on the threshold "th" settings of the PLL device. The phenomenon has nothing to do with the quality of data reproduction.

In order to resolve the above-described problem, the inventors of the present invention have come up with the following technique: a check is first made to see whether or not the phase positions of the synchronous sampling data coming from the PLL device are under the reverse phase condition. If the reverse phase condition is not recognized, the result of the operation using the equation (4) above is used as phase error information. If the reverse phase condition is detected, then phase error information different from that derived from the equation (4) is utilized. To be more exact, as will be discussed later in more detail, if d=1 and PR(1, 0, −1) is in effect and if the reverse phase condition is not detected, the result of the operation based the equation (4) above is used primarily as the phase error information. On the other hand, "0" is utilized as the phase error information if the transition from "data_D" to "data_now" is from "0" to "±1" or from "±1" to "0." That is because the transition can take place regardless of the reverse phase condition being detected or not.

FIG. 10 is a block diagram showing a structure of a phase locking apparatus to which the technique of the present invention is applied, the apparatus constituting the PLL device 5 shown in FIG. 1. Of the reference numerals in the PLL device 5 of FIG. 10, those already used in the typical PLL device of FIG. 3 designate like or corresponding parts or devices, and their descriptions will be omitted where redundant.

In the example of FIG. 10, the PLL device 5 is structured as a digital ITR type PLL circuit. Thus the PLL device 5 in FIG. 10 has an interpolating filter device 11, a phase error information detecting device 31, a loop filter device 13, and a remainder accumulator device 14. As opposed to the typical PLL device in FIG. 3, the PLL 5 is practiced as a phase locking apparatus embodying the present invention using the phase error information detecting device 31 that replaces the phase error information detecting device 12.

Of the components making up the PLL device 5, only the phase error information detecting device 31 will be explained below. In the setup of FIG. 10, the phase error information detecting device 31 is constituted by a slicing device 41 and a phase error detecting device 42.

The slicing device 41 basically has the same structure and functionality as the slicing device 21 in FIG. 3. Where synchronous sampling data output from the PLL device 5 is a digital signal shaped in waveform through PR(1, −1) equalization, the slicing device 41 checks to determine which of the inequalities (1) through (3) shown above is satisfied by "data_now." The slicing device 41 determines that the slice value is "1" if the inequality (1) is satisfied, "0" if the inequality (2) is satisfied, or "−1" if the inequality (3) is satisfied. The slice value thus determined is forwarded as "slice_now" to the phase error detecting device 42.

In the example of FIG. 10, the phase error detecting device 42 is made up of a phase position determining device 51 and a phase error information calculating device 52.

The phase error determining device 51 checks to determine whether or not the phase positions of "data_now" and "data_D" in the combination (slice_D, slice_now) provided by the slicing device 41 are under the reverse phase condition, "slice_D" being the slice value preceding the current slice value "slice_now."

More specifically, as discussed above with reference to FIGS. 4 through 6, the phase position determining device 51 determines that the phase positions of "data_now" and "data_D" are not under the reverse phase condition if the synchronous sampling data constitutes a digital signal shaped in waveform through PR(1, −1) equalization where d=1, and if the combination (slice_D, slice_now) is any one of (0, −1), (0, 1), (1, 0) and (−1, 0). On the other hand, if the combination (slice_D, slice_now) is one of (1, −1), (1, 1), (−1, 1) and (−1, −1) as mentioned above, the phase position determining device 51 determines that the phase positions of "data_now" and "data_D" are under the reverse phase condition.

The combination (slice_D, slice_now) could take on (0, 0) (e.g., positions at 180 and 270 in FIG. 6). When the equation (4) above is carried out, the output (i.e., phase_err resulting from the operation) is "0." Thus when (slice_D, slice_now)= (0, 0), the result is equivalent to not having any determination accomplished by the phase position determining device 51.

The result of the determination by the phase position determining device 51 is supplied to the phase error information calculating device 52. Illustratively, given from the phase position determining device 51 the determination that the phase positions of "data_now" and "data_D" are not under the reverse phase condition, the phase error information calculating device 52 calculates phase error information in accordance with the operational method defined by the equation (4) above (called the first operation method of reference hereunder). That is, the device 52 calculates "phase_err" as the phase error information and sends it to the loop filter device 13. On the other hand, if the phase position determining device 51 has supplied the determination that the phase positions of "data_now" and "data_D" are under the reverse phase condition, then the phase error information calculating device 52 calculates phase error information in accordance with a second operational method different from the first operational method. The phase error information thus calculated is forwarded to the loop filter device 13. Specific examples of the second operational method will be described later with reference to FIGS. 12 through 16.

Figure 11:
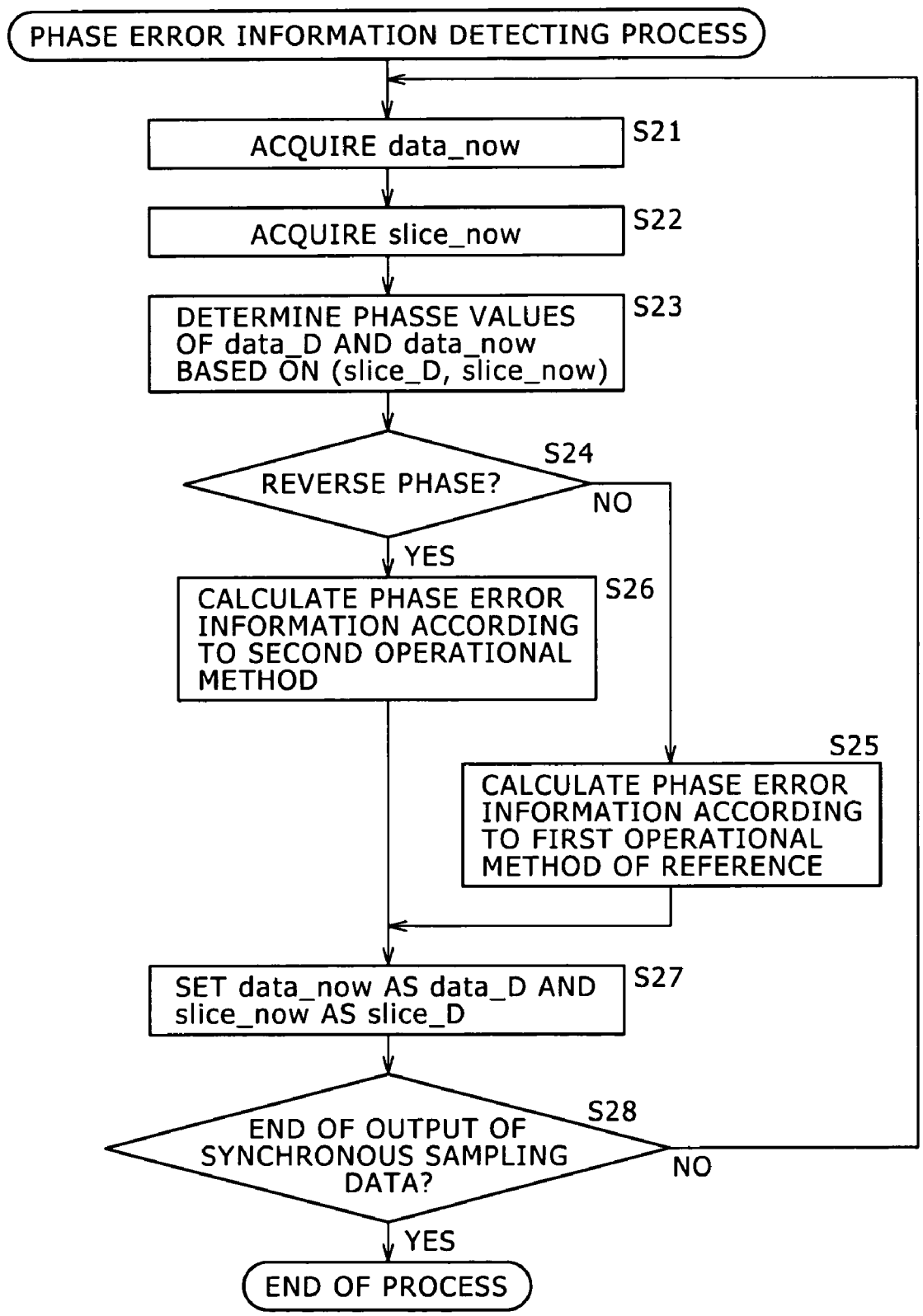
FIG. 11 is a flowchart of steps constituting a phase error information detecting process performed by a phase error information detecting device indicated in FIG. 10.

FIG. 11 is a flowchart of steps constituting a typical process carried out by the phase error information detecting device 31. This process, called the phase error information detecting process hereunder, is described below in reference to FIG. 11.

In step S21, the phase error information detecting device 31 acquires as "data_now" one sampling value from among the synchronous sampling data furnished as the immediately preceding output from the interpolating filter device 11. After the value "data_now" is fed to the slicing device 41 and phase error information calculating device 52, step S22 is reached.

In step S22, the slicing device 41 acquires "slice_now" from "data_now" as discussed above. After the value "slice_now" is supplied from the slicing device 41 to the phase position determining device 51 and phase error information calculating device 52, step S23 is reached.

In step S23, the phase position determining device 51 determines the phase positions of "data_D" and "data_now" based on the combination (slice_D, slice_now) as described above. After the result of the determination is sent from the phase position determining device 51 to the phase error information calculating device 52, step S24 is reached.

As will be discussed later, the phase positions of "data_D" and "data_now" may alternatively be determined in accordance with not only "slice_D" and "slice_now" but also a transition pattern supplemented with the slice value acquired at least two time intervals earlier than the value "slice_now."

In step S24, the phase error information calculating device 52 checks to determine whether or not the result of the determination in step S23 by the phase position determining device 51 shows that the reverse phase condition is in effect.

If in step S24 the reverse phase condition is not found to be in effect, step S25 is reached. In step S25, the phase error information calculating device 52 calculates the phase error information in accordance with the first operational method of reference as mentioned above.

If in step S24 the reverse phase condition is found to be in effect, step S26 is reached. In step S26, the phase error information calculating device 52 calculates the phase error information in accordance with the second operational method as described above.

After the phase error information is calculated by the phase error information calculating device 52 and supplied to the loop filter device 13 in step S25 or S26, step S27 is reached.

In step S27, the phase error information detecting device 31 sets the current "data_now" as "data_D" and the current "slice_now" as "slice_D." In some cases, the current "data_D" may be set as "data__2D" and the current "slice_D" as "slice__2D" in step S27. The values "data__2D" and "slice__2D" will be explained later.

In step S28, the phase error information detecting device 31 checks to determine whether or not the output of the synchronous sampling data from the interpolating filter device 11 has come to an end.

As long as the output of the synchronous sampling data from the interpolating filter device 11 continues, the result of the check in step S28 is negative ("NO") and step S21 is reached again. Steps S21 through S28 are then repeated in a loop iteration.

When the output of the synchronous sampling data from the interpolating filter device 11 is terminated, the result of the check in step S28 becomes affirmative ("YES"). This brings the phase error information detecting process to an end.

Examples of the second operational method used in step S26 will now be described by referring to FIGS. 12 through 15.

FIG. 12 is a tabular view showing a typical algorithm for use by the classic phase error information detecting device 12 in the classic PLL setup of FIG. 3 where d=1 and PR(1, −1) equalization is in effect.

In the table of FIG. 12, the column "APPEARANCE" is assumed to carry items each indicating whether the pattern (slice_D, slice_now) shown on the left appears, provided there is no error (at normal ideal time). In this column, each double circle (⊚) indicates that the pattern (slice_D, slice_now) shown left will appear at normal time, i.e., when there is no error; each cross (x) indicates that the pattern (slice_D, slice_now) shown left will not appear at normal time with no error. The latter case points to the patterns in effect when the reverse phase condition is in effect illustratively in FIG. 12.

Also in the table of FIG. 12, the column "CORRECTION" is assumed to carry items each indicating whether or not phase correction based on "phase_err" (explained below) is feasible. In this column, each double circle (⊚) indicates that phase correction can be made using the pattern (slice_D, slice_now) shown left where there is no error; each cross (x) indicates that phase correction may not be accomplished using the pattern (slice_D, slice_now) shown left where there is no error.

Furthermore, each notation "phase_err" in FIG. 12 is assumed to represent phase error information (and the method by which to calculate the information). In the table, the notation "FORWARD DIRECTION phase_err" denotes the equation (4) above (also shown at the bottom of FIG. 12). That is, at normal time with no error, the phase error information is calculated in accordance with the operational method represented by the equation (4) above (i.e., first operational method of reference).

The above assumptions regarding FIG. 12 also apply to the description that follows in reference to FIGS. 13 through 16.

As indicated by the cross (x) in the "APPEARANCE" column of FIG. 12, no phase error information is output by the classic PLL setup when the reverse phase condition is in effect (i.e., "0" is output). This, as described above, is the cause of the traditionally experienced problem of the PLL setup becoming abruptly incapable of acquiring error rates.

Where the reverse phase condition is in effect as indicated by each cross (x) in the "APPEARANCE" column of FIG. 13, the phase error information detecting device 31 of the inventive PLL device 5 in FIG. 10 calculates as phase error information the value "rev_phase_err" using the equation (5) below (also shown at the bottom of FIG. 13):

$$rev\_phase\_err = -phase\_err \qquad (5)$$

The method for calculating "rev_phase_err" as the phase error information based on the equation (5) above is one example of the second operational method used in step S26 of FIG. 11.

FIG. 13 thus illustrates a typical algorithm used by the phase error information detecting device 31 in the PLL device 5 of FIG. 10 embodying the present invention, where d=1 and PR(1, −1) equalization is in effect.

In FIG. 13, each notation "BACKWARD DIRECTION rev_phase_err" is equivalent to the value that is the same as "phase_err" in absolute terms but has the reversed sign. An asterisk (*) is attached to the leftmost field of each row where "BACKWARD DIRECTION rev_phase_err" applies. The value "rev_phase_err" may then be calculated by use of the equation (6) below instead of the equation (5) shown above:

$$rev\_phase\_err = (\text{reversed sign of phase\_err output}) \times RLEV \qquad (6)$$

where, (reversed sign of phase_err output) stands for a minus (−) sign if the value "phase_err" resulting from the equation (4) is a positive value, and represents a plus (+) sign if the value "phase_err" obtained likewise is a negative value; and RLEV denotes a predetermined constant (e.g., threshold).

As described, when determining the phase error information where d=1 and PR(1, −1) is in effect, the phase error information detecting device 31 may utilize not only the classic algorithm shown FIG. 12 but also the new algorithm indicated in FIG. 13, the latter algorithm being modified to accommodate the reverse phase condition that may be found in effect.

In addition, the phase error information determining device 31 can determine phase error information in accordance with another algorithm shown in FIG. 14. FIG. 14 shows another new algorithm which takes into account the reverse phase condition and which is used by the phase error information detecting device 31 where d=1 and PR(1, −1) equalization is in effect.

The example of FIG. 14 introduces an algorithm designed to resolve more effectively the traditionally experienced problem (thereby creating a more stable circuit setup) where PR(1, −1) is in effect.

The algorithm example in FIG. 13 was shown to be an algorithm based on the combination (slice_D, slice_now), where "slice_D" was acquired one time interval earlier than "slice_now" (i.e., slice_D corresponds to "data_D" obtained one time interval earlier than "data_now"). The algorithm example in FIG. 14, by contrast, is an algorithm based on another combination (slice_2D, slice_D, slice_now). This algorithm is formed by supplementing the above-described combination (slice_D, slice_now) with "slice_2D" which stands for the slice value taken two time intervals earlier than "slice_now," i.e., the data acquired two time intervals earlier than "data_now."

Illustratively, if (slice_D, slice_now)=(1, 0) at normal ideal time with no error, the (0, 1, 0) can appear as representative of the combination (slice_2D, slice_D, slice_now) but the pattern (1, 1, 0) or (−1, 1, 0) will not appear. The pattern (1, 1, 0) can appear as representative of the combination (slice_2D, slice_D, slice_now) when the reverse phase condition is in effect.

Likewise, if (slice_D, slice_now)=(−1, 0) at normal ideal time with no error, the pattern (0, −1, 0) can appear as representative of the combination (slice_2D, slice_D, slice_now) but the pattern (1, −1, 0) or (−1, −1, 0) will not appear. The pattern (−1, −1, 0) can appear as representative of the combination (slice_2D, slice_D, slice_now) when the reverse phase condition is in effect.

The algorithm example in FIG. 14 introduces a new technique. That is, where the combination (slice_2D, slice_D, slice_now) takes either the pattern (1, 1, 0) or the pattern (−1, −1, 0), the reverse phase condition is recognized and the phase error information is obtained in accordance with the calculating method shown in the corresponding field of the "phase_err" column on the right (the method in this case involves outputting "0").

As described, when the data reproducing apparatus of FIG. 1 is to carry out PR(1, −1) equalization using the RLL code (reproduced RF signal) where d=1, the apparatus may utilize the algorithm of FIG. 13 or FIG. 14. This allows the entire data reproducing apparatus (i.e., system) to prevent the PLL device 5 from locking onto the reverse phase condition when the diverse settings about the reproduced waveform such as AGC or DCC settings on the AGC/DCC device 4, slice threshold settings on the PLL device 5, or tap settings on the EQ device 3, are inappropriate. The data reproducing apparatus as a whole is thus stabilized in its performance.

In the above-described examples, the PLL device 5 of FIG. 10 was assumed to be furnished with the algorithm capable of PR(1, −1) equalization. For that reason, the synchronous sampling data was output by the PLL device 5 as a digital signal shaped in waveform through PR(1, −1) equalization.

However, the algorithms that may be provided to the PLL device 5 are not limited to those capable of PR(1, −1) equalization. Alternatively, the PLL device 5 may be furnished with an algorithm capable of PR(1, 0, −1) equalization. That is, the PLL device 5 may output as its synchronous sampling data a digital signal shaped in waveform through PR(1, 0, −1) equalization.

In the foregoing case, it should be noted that when PR(1, 0, −1) equalization is performed using the RLL recording code (d=1), the output in effect with the continuation of 2T is 1, 1, −1, −1, 1, 1, −1, −1, etc., unlike the output in effect with the continuation of 2T where PR(1, −1) equalization is carried out. Likewise, when PR(1, 0, −1) equalization is performed using the RLL recording code (d=1), the output in effect with the continuation of 3T or more is 1, 1, 0, 0, −1, −1, 0, 0, 1, 1, 0, −1, −1, 0, etc., different from the output in effect with the continuation of 3T or more where PR(1, −1) equalization is carried out.

Thus as shown in FIG. 15, at normal time with no error (i.e., at normal ideal time), the combination (slice_D, slice_now) may take any one of the patterns (0, −1), (0, 1), (1, 0) and (−1, 0). The patterns (1, −1), (1, 1), (−1, 1), (−1, −1) and (0, 0) could also appear. When the reverse phase condition is in effect, the combination (slice_D, slice_now) may take one of the patterns (0, −1), (0, 1), (1, 0), (−1, 0), and (0, 0).

FIG. 15 is a tabular view for explaining a typical algorithm for use with the phase error information detecting device 12 in the classic PLL setup of FIG. 3, where d=1 and PR(1, 0, −1) equalization is in effect.

As shown in FIG. 15, the combination (slice_D, slice_now) can take any one of the patterns (0, −1), (0, 1), (1, 0) and (−1, 0) both at normal time and under the reverse phase condition. No phase error information was output by the classic PLL setup ("0" was output instead).

The phase error information detecting device 31 of this embodiment in FIG. 10 can illustratively determine phase error information by utilizing the algorithm of FIG. 16 where d=1 and PR(1, 0, −1) equalization is in effect. That is, FIG. 16 shows a representative algorithm capable of handling the reverse phase condition as well as executing PR(1, 0, −1) equalization where d=1.

More specifically, the algorithm in FIG. 16 introduces a new technique. That is, where the combination (slice_2D, slice_D, slice_now) takes either the pattern (0, 1, 0) or the pattern (0, −1, 0) (indicated by an asterisk (*) attached to the rightmost field), the reverse phase condition is recognized and the phase error information is obtained in accordance with the calculating method shown in the corresponding field of the "phase_err" column on the right.

The notation "BACKWARD DIRECTION (2D) rev_phase_err_2D" in the "phase_err" column on the right is equivalent to the value that is the same as "phase_err_2D" in absolute terms on the left side of the following equation (7) (also shown second from the top in FIG. 16, underlined) but has the reversed sign:

$$\text{phase\_err\_2D} = (\text{data\_now} \times \text{slice\_D}) - (\text{data\_2D} \times \text{slice\_D}) \quad (7)$$

Thus the notation "BACKWARD DIRECTION (2D) rev_phase_err_2D" denotes the left side in the following equation (8) (also shown at the bottom of FIG. 16) or equation (9):

$$\text{rev\_phase\_err\_2D} = -\text{phase\_err\_2D} \quad (8)$$

$$\text{rev\_phase\_err\_2D} = (\text{reversed sign of phase\_err\_2D output}) \times RLEV \quad (9)$$

where, (reversed sign of phase_err_2D output) stands for a minus (−) sign if the value "phase_err_2D" resulting from the equation (9) is a positive value, and represents a plus (+) sign if the value "phase_err_2D" obtained likewise is a negative value; and RLEV denotes a predetermined constant.

When executing PR(1, 0, −1) equalization by use of the RLL code (reproduced RF signal) where d=1, the data reproducing apparatus of FIG. 1 may employ the representative algorithm in FIG. 16 for rapid correction of the reverse phase condition as described. The synchronous sampling data from the PLL device 5 may be found under the reverse phase condition when the diverse settings about the reproduced waveform such as AGC or DCC settings on the AGC/DCC device 4, slice threshold settings on the PLL device 5, or tap settings on the EQ device 3, are inappropriate. In such cases, the algorithm allows the entire data reproducing apparatus (i.e., system) to make rapid transition to normal state and stabilize its performance.

As explained above, the PLL device 5 that converts the asynchronous sampling data corresponding to the RLL code (d=1) into synchronous sampling data can generate phase error information through the use of a PR equalization method supplemented with an algorithm for correcting the reverse phase condition (i.e., for restoring the initial state). More specifically, this algorithm involves checking to determine whether the phase positions of "data_now" and "data_D" are under the reverse phase condition, by utilizing as a phase position reference the patterns that do not exist at normal ideal time for each PR equalization method. The result of the determination is used as the basis for changing the operational methods for calculating the phase error information. Consequently, it is possible illustratively for the PR(1, −1) equalization setup to avoid locking onto the reverse phase condition and for the PR(1, 0, −1) equalization setup to rapidly correcting the reverse phase condition. As a result, the system as a whole including the PLL device 5 (i.e., data reproducing apparatus of FIG. 1) is allowed suitably to stabilize its performance.

It should be noted that PR(1, −1) equalization or PR(1, 0, −1) equalization does not constitute the only method according to this invention, i.e., method for calculating phase error information in a manner different from that used at normal ideal time if any pattern emerges which represents a slice value transition that is not exist at normal time.

Illustratively, where d=2 and PR(1, −1) equalization is in effect, the combination (slice_D, slice_now) do not take the pattern (1, 1) or (−1, −1) at normal ideal time, i.e., patterns in effect when slice value transition takes place from "+1" to "+1" or from "−1" to "−1." If any of these patterns is in effect, phase error information may be calculated using an operational method different from that used at normal ideal time. With the different operational method in use, unlike the case of PR(1, −1) equalization where d=1, slice value transition will not take place from "+1" to "−1" or from "−1" to "+1."

In another example, where d=2 and PR(1, 0, −1) equalization is in effect, the combination (slice_2D, slice_D, slice_now) may not take the pattern (0, 1, 0) or (0, −1, 0) at normal ideal time, i.e., patterns in effect when slice value transition takes place from "0" to "+1" to "0" or from "0" to "−1" to "0." If any of these patterns is in effect, phase error information may be calculated using an operational method different from that used at normal ideal time.

In the end, if slice value transition occurs in patterns which exist under the reverse phase condition but which do not exist normally (i.e., at normal ideal time) depending on the combination of "d" with the PR equalization method, the phase error information need only be calculated using an operation method different from that utilized at normal ideal time.

The techniques of the present invention apply in the same manner not only to the PLL device 5 having the slicing device 41 as shown in FIG. 10, but also to any PLL setup capable of outputting tentatively determined values.

Figure 17:
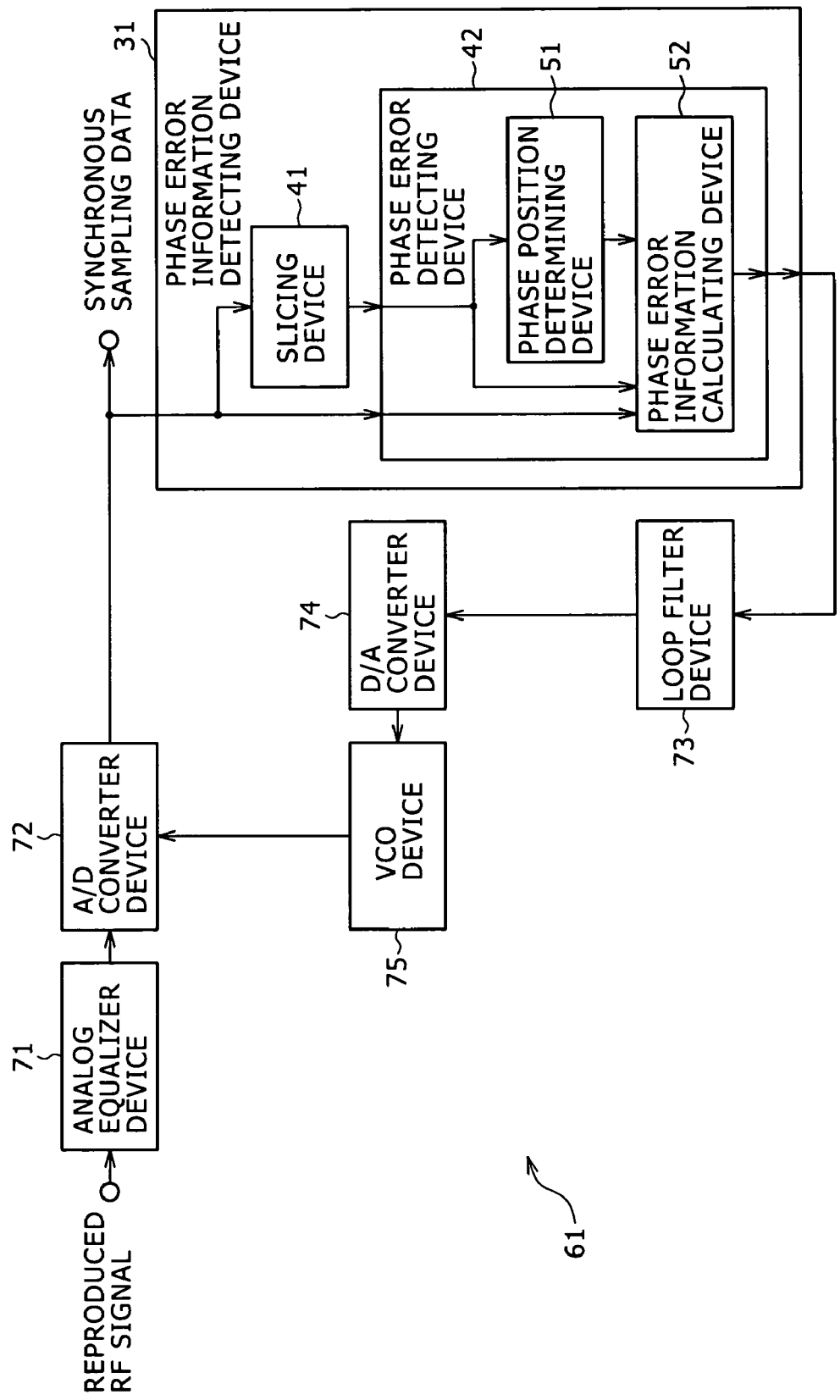
FIG. 17 is a block diagram showing a structure of a phase locking apparatus practiced as another embodiment of the present invention different from the embodiment of FIG. 10.

The techniques of this invention equally apply not only to the PLL device 5 in FIG. 10 but also to a PLL setup such as one shown in FIG. 17 which adopts a VCO (voltage controlled oscillator) for changing the sampling frequency and phases of the A/D converter without utilization of the interpolating filter device. FIG. 17 illustrates a PLL setup which embodies the present invention and which is different from the example indicated in FIG. 10.

In the example of FIG. 17, a PLL device 61 is made up of an analog equalizer device 71, an A/D converter device 72, a phase error information detecting device 31, a loop filter device 73, a D/A converter device 74, and a VCO device 75.

Given the reproduced RF signal, the analog equalizer device 71 generates an analog signal shaped in waveform through a predetermined PR method such as PR(1, −1) equalization. The analog signal thus generated is supplied to the A/D converter device 72.

The A/D converter device 72 generates synchronous sampling data in digital form for output. The device 72 performs the operation by synchronously sampling the analog signal coming from the analog equalizer device 71 in synchronism with the frequency of a VCO output signal from the VCO device 75.

The synchronous sampling data from the A/D converter 72 is also supplied to the phase error information detecting device 31. This phase error information detecting device 31 is the same functionally as its counterpart in the above-described PLL device 5 in FIG. 10 and thus will not be discussed further.

In addition to the phase error information sent from the phase error information detecting device 31, the loop filter device 73 uses a predetermined loop filter coefficient, as well as a suitable initial value if necessary, so as to perform a loop filter operation. The result of the operation is forwarded to the D/A converter device 74.

The D/A converter device 74 converts the result of the loop filter operation made by the loop filter device 73 in the form of a digital signal into an analog signal. The analog signal thus acquired is supplied to the VCO device 75 as a VCO input signal.

In keeping with the voltage level of the VCO input signal coming from the D/A converter device 74, the VCO device 75 generates a VCO output signal. The VCO output signal thus generated is sent to the A/D converter device 72 and other components.

As explained, the methods of the present invention can be applied to diverse PLL setups including the PLL device 5 in FIG. 10 and the PLL device 61 in FIG. 17. In other words, a PLL setup based on the inventive methods is easily implemented when the phase error information detecting device 31 shown in FIG. 10 or in FIG. 17 is adopted in place of the traditional phase error information detecting device 12 indicated in FIG. 3.

Furthermore, the PLL setup to which the methods of the present invention are applied (practiced) is incorporated easily not only in the data reproducing apparatus of FIG. 1 but also in various apparatuses and systems (the system in this context will be defined later).

In another example, the methods according to the present invention may be applied to a data reproducing apparatus that replaces the above-described differential filter device 1 in FIG. 1 with a suitable filter device capable of generating an analog signal through a suitable PR equalization technique based on the reproduced RF signal.

In yet another example, the methods of the present invention may be applied to a data reproducing apparatus that replaces the above-mentioned PRML device 6 in FIG. 1 with a data detecting device capable of detecting the RLL code from the synchronous sampling data coming from the PLL device 5.

The series of steps or processes (or part of them) described above may be executed either by hardware or by software. Where the software-based processing is to be performed, part (e.g., PLL device 5) or all of the data reproducing apparatus in FIG. 1 or the PLL device 61 in FIG. 17 may be constituted partially or entirely by a computer such as one shown in FIG. 18.

In FIG. 18, a CPU (central processing unit) 101 carries out diverse processes in accordance with the programs stored in a ROM (read only memory) 102 or programs loaded from a storage device 108 into a RAM (random access memory) 103. The RAM 103 also retains data that may be needed by the CPU 101 in executing its processing.

The CPU 101, ROM 102, and RAM 103 are interconnected by a bus 104. An input/output interface 105 is also connected to the bus 104.

The input/output interface 105 is connected with an input device 106, an output device 107, the storage device 108, and a communication device 109. Illustratively, the input device 106 is formed by a keyboard and a mouse; the output device 107 is composed of a display unit; the storage device 108 is constituted by a hard disk drive; and the communication device 109 is made up of a modem and a terminal adapter. The communication device 109 communicates with other apparatuses (not shown) via networks including the Internet.

The input/output interface 105 is connected with a drive 110 as needed. The drive 110 may be loaded with a removable recording medium 111 such as a magnetic disk, an optical disk, a magneto-optical disk, or a semiconductor memory. The computer program or programs that may be retrieved from the loaded recording medium are installed as needed into the storage device 108.

Where a series of steps is to be carried out by software, the program or programs constituting that software may be either incorporated beforehand in dedicated hardware of a computer or installed upon use over a network or from a suitable recording medium into the computer (e.g., general-purpose personal computer) capable of executing diverse functions based on the installed programs.

As shown in FIG. 18, the recording medium accommodating the above-described program or programs and distributed to users apart from the apparatus is constituted not only by the removable recording medium (marketed as package media) 11 such magnetic disk (including floppy disks), optical disks (including CD-ROM (compact disc read-only memory) and DVD (digital versatile disc)), magneto-optical disks (including MD (Mini-disc)), or semiconductor memories; but also by the ROM 102 and the hard disk drive in the storage unit 108 preinstalled in the apparatus before being offered to users.

In this specification, the steps that describe the program or programs stored on the recording medium represent not only the processes that are to be carried out in the depicted sequence (i.e., on a time series basis) but also processes that may be performed parallelly or individually and not chronologically.

In this specification, the term "system" refers to an entire configuration made up of a plurality of processors, processing devices and/or other components as implied earlier.

It should be understood by those skilled in the art that various modifications, combinations, sub-combinations and alterations may occur depending on design requirements and other factor in so far as they are within the scope of the appended claims or the equivalents thereof.

What is claimed is:

1. A phase locking apparatus which, when data is recorded on a recording medium as an RLL recording code where d>0 is read therefrom as data in asynchronous relation with a predetermined frequency, generates synchronous data in synchronism with said predetermined frequency from the asynchronous data, said phase locking apparatus comprising phase error information detecting means for detecting phase error information indicating a phase error in said synchronous data, wherein said phase error information detecting means includes:

phase position determining means determines, based on run length limited information, whether or not phase positions of a first value and a second value contiguous to said first value from among sampling values constituting said synchronous data are under a reverse phase condition in effect when only one of said first and said second values is in excess of a predetermined threshold; and phase error information calculating means calculates said phase error information in each of two cases determined, one with said reverse phase condition found to be in effect by said phase position determining means and the other without said reverse phase condition found to be in effect;

wherein said run length limited information is information based on a minimum run length where d is at least 1; and wherein said run length limited information is information indicating transitions of partial responses based on the limit of said minimum run length to said synchronous data;

wherein said partial responses based on the limit of said minimum run length to said synchronous data occur where d=1 and PR(1, −1; and wherein said phase position determining means determines that said reverse phase condition is in effect if the transitions of the patterns occurring where d=1 and PR(1, −1) form a pattern which exist under said reverse phase condition and which does not exist without said reverse phase condition, said phase position determining means further determining that said reverse phase condition is not in effect if said transitions form any other pattern.

2. A phase locking apparatus which, when data is recorded on a recording medium as an RLL recording code where d>0 is read therefrom as data in asynchronous relation with a predetermined frequency, generates synchronous data in synchronism with said predetermined frequency from the asynchronous data, said phase locking apparatus comprising phase error information detecting means for detecting phase error information indicating a phase error in said synchronous data, wherein said phase error information detecting means includes:

phase position determining means determines, based on run length limited information, whether or not phase positions of a first value and a second value contiguous to said first value from among sampling values constituting said synchronous data are under a reverse phase condition in effect when only one of said first and said second values is in excess of a predetermined threshold; and phase error information calculating means calculates said phase error information in each of two cases determined, one with said reverse phase condition found to be in effect by said phase position determining means and the other without said reverse phase condition found to be in effect;

wherein said run length limited information is information based on a minimum run length where d is at least 1; and wherein said run length limited information is information indicating transitions of partial responses based on the limit of said minimum run length to said synchronous data;

wherein said partial responses based on the limit of said minimum run length to said synchronous data occur where d=1 and PR(1, 0, −1); and wherein said phase position determining means determines that said reverse phase condition is in effect if the transitions of the patterns occurring where d=1 and PR(1, 0, −1) form a pattern which exist under said reverse phase condition and which does not exist without said reverse phase condition, said phase position determining means further determining that said reverse phase condition is not in effect if said transitions form any other pattern.

3. A phase locking apparatus which, when data is recorded on a recording medium as an RLL recording code where d>0 is read therefrom as data in asynchronous relation with a predetermined frequency, generates synchronous data in synchronism with said predetermined frequency from the asynchronous data, said phase locking apparatus comprising phase error information detecting means for detecting phase error information indicating a phase error in said synchronous data, wherein said phase error information detecting means includes:

phase position determining means determines, based on run length limited information, whether or not phase positions of a first value and a second value contiguous to said first value from among sampling values constituting said synchronous data are under a reverse phase condition in effect when only one of said first and said second values is in excess of a predetermined threshold; and phase error information calculating means calculates said phase error information in each of two cases determined, one with said reverse phase condition found to be in effect by said phase position determining means and the other without said reverse phase condition found to be in effect;

wherein said phase error information calculating means calculates said phase error information using at least two of the sampling values within a predetermined range of said synchronous data including said first value, and at least two tentatively determined values with regard to said at least two sampling values within said predetermined range.

4. The phase locking apparatus according to claim 3, wherein said phase error information detecting means comprises tentatively determined value calculating means for calculating said at least two tentatively determined values with regard to said at least two sampling values within said predetermined range, and wherein said phase position determining means determines whether or not said reverse phase condition is in effect, using as said run length limited information said at least two tentatively determined values calculated by said tentatively determined value calculating means.

5. A phase locking apparatus which, when data is recorded on a recording medium as an RLL recording code where d>0 is read therefrom as data in asynchronous relation with a predetermined frequency, generates synchronous data in synchronism with said predetermined frequency from the asynchronous data, said phase locking apparatus comprising phase error information detecting means for detecting phase error information indicating a phase error in said synchronous data, wherein said phase error information detecting means includes:

phase position determining means determines, based on run length limited information, whether or not phase positions of a first value and a second value contiguous to said first value from among sampling values constituting said synchronous data are under a reverse phase condition in effect when only one of said first and said second values is in excess of a predetermined threshold; and phase error information calculating means calculates said phase error information in each of two cases determined, one with said reverse phase condition found to be in effect by said phase position determining means and the other without said reverse phase condition found to be in effect;

wherein said phase position determining means, having determined that said reverse phase condition is in effect, further determines which of a plurality of patterns of said reverse phase condition is in effect; and wherein said phase error information calculating means calculates said phase error information for each of said plurality of patterns of said phase error information determined.

6. A phase locking apparatus which, when data is recorded on a recording medium as an RLL recording code where d>0 is read therefrom as data in asynchronous relation with a predetermined frequency, generates synchronous data in synchronism with said predetermined frequency from the asynchronous data, said phase locking apparatus comprising phase error information detecting means for detecting phase error information indicating a phase error in said synchronous data, wherein said phase error information detecting means includes:

phase position determining means determines, based on run length limited information, whether or not phase positions of a first value and a second value contiguous to said first value from among sampling values constituting said synchronous data are under a reverse phase condition in effect when only one of said first and said second values is in excess of a predetermined threshold; and phase error information calculating means calculates said phase error information in each of two cases determined, one with said reverse phase condition found to be in effect by said phase position determining means and the other without said reverse phase condition found to be in effect;

wherein said phase error information calculating means calculates said phase error information in accordance with a first operational method of reference if said phase position determining means determines that said reverse phase condition is not in effect, said phase error information calculating means further calculating said phase error information in accordance with a second operational method different from said first operational method if said phase position determining means determines that said reverse phase condition is in effect.

7. The phase locking apparatus according to claim 6, wherein said second operational method involves calculating as said phase error information a value having a sign different from that of the value calculated as said phase error information in accordance with said first operational method.

8. The phase locking apparatus according to claim 7, wherein said first operational method involves outputting as said phase error information a value calculated by use of a predetermined operation expression; and wherein said second operational method involves outputting as said phase error information the value which is the same, except for a reversed sign, as said value calculated by use of said predetermined operation expression.

9. The phase locking apparatus according to claim 7, wherein said first operational method involves outputting as said phase error information a value calculated by use of a predetermined operation expression; and wherein said second operational method involves outputting a predetermined value as said phase error information.

10. The phase locking apparatus according to claim 9, wherein said predetermined value output by said second operational method is zero.

11. A data reproducing apparatus for reproducing data recorded on a recording medium as an RLL recording code where d>0, said data reproducing apparatus comprising:

differentiating means for generating a differential response signal with regard to an analog signal read from said recording medium in a manner representing said data;

sampling means for generating asynchronous data by sampling said differential response signal generated in analog form by said differentiating means in asynchronous relation with a predetermined frequency; and phase locking means for generating synchronous data in synchronism with said predetermined frequency from said asynchronous data generated by said sampling means, wherein said phase locking means includes phase error information detecting means for detecting phase error information indicating a phase error in said synchronous data;

wherein said phase error information detecting means includes:

phase position determining means; and phase error information calculating means, wherein said phase position determining means determines, based on run length limited information, whether or not phase positions of a first value and a second value contiguous to said first value from among sampling values constituting said synchronous data are under a reverse phase condition in effect when only one of said first and said second values is in excess of a predetermined threshold; and wherein said phase error information calculating means calculates said phase error information in each of two cases determined, one with said reverse phase condition found to be in effect by said phase position determining means and the other without said reverse phase condition found to be in effect, wherein said phase locking means comprises:

loop filter means for performing a loop filter operation using at least said phase error information detected by said phase error information detecting means in order to output a result of the operation;

remainder accumulator means for performing a predetermined cumulative operation on the operation result coming from said loop filter means and, based on a result of the cumulative operation, to generate and output information necessary for adjusting phase positions of sampling values constituting said asynchronous data; and phase adjusting means for adjusting the phase positions of said sampling values constituting said asynchronous data by use of said information output from said remainder accumulator means in order to output as said synchronous data the data constituted by said sampling values following the adjustment.

12. A data reproducing apparatus for reproducing data recorded on a recording medium as an RLL recording code where d>0, said data reproducing apparatus comprising:

differentiating means for generating a differential response signal with regard to an analog signal read from said recording medium in a manner representing said data;

sampling means for generating asynchronous data by sampling said differential response signal generated in analog form by said differentiating means in asynchronous relation with a predetermined frequency; and phase locking, means for generating synchronous data in synchronism with said predetermined frequency from said asynchronous data generated by said sampling means, wherein said phase locking means includes
  phase error information detecting means for detecting phase error information indicating a phase error in said synchronous data;
  wherein said phase error information detecting means includes:
    phase position determining means; and
    phase error information calculating means,
      wherein said phase position determining means determines, based on run length limited information, whether or not phase positions of a first value and a second value contiguous to said first value from among sampling values constituting said synchronous data are under a reverse phase condition in effect when only one of said first and said second values is in excess of a predetermined threshold; and
      wherein said phase error information calculating means calculates said phase error information in each of two cases determined, one with said reverse phase condition found to be in effect by said phase position determining means and the other without said reverse phase condition found to be in effect, wherein said phase error information detecting means included in said phase locking means includes
  slicing means for calculating slice values based on results of comparisons between each of said sampling values constituting said synchronous data and a predetermined threshold; and
  wherein said phase position determining means included in said phase error information detecting means determines whether or not said reverse phase condition is in effect, using as said run length limited information transitions of said slice values calculated by said slicing means.

13. The data reproducing apparatus according to claim 12, wherein d=1 in said RLL recording code recorded on said recording medium; and
  wherein said phase error information detecting means detects said phase error information in accordance with a PR(1, −1) equalization algorithm.

14. The data reproducing apparatus according to claim 13, wherein the value preceding said first value to be processed from among said sampling values constituting said synchronous data is regarded as said second value;
  wherein said phase position determining means determines whether or not said reverse phase condition is in effect, based on a combination of a second slice value corresponding to said second value with a first slice value corresponding to said first value from among said slice values calculated by said slicing means;
  wherein, if said reverse phase condition is not found to be in effect, said phase error information calculating means calculates said phase error information in accordance with a first operational method using an operation expression given as phase_err=(data_now*slice_D)−(data_D*slice_now)

where, data_now stands for said first value, data_D for said second value, slice_now for said first slice value, slice_D for said second slice value, and phase_err for said phase error information; and
  wherein, if said reverse phase condition is found to be in effect, said phase error information calculating means calculates said phase error information in accordance with a second operational method different from said first operational method.

15. The data reproducing apparatus according to claim 14, wherein said second operational method uses an operation expression given as rev_phase_err=−phase_err where, rev_phase_error stands for said phase error information.

16. The data reproducing apparatus according to claim 14, wherein said second operational method uses an operation expression given as rev_phase_err= (reversed sign of phase_err output)× RLEV where, (reversed sign of phase_err output) stands for a minus sign if phase_err has a plus sign and for a plus sign if phase_err has a minus sign, RLEV denotes a predetermined constant, and rev_phase_err represents said phase error information.

17. The data reproducing apparatus according to claim 16, wherein RLEV=0 in said operation expression used by said second operational method.

18. The data reproducing apparatus according to claim 12, wherein d=1 in said RLL recording code recorded on said recording medium; and
  wherein said phase error information detecting means detects said phase error information in accordance with a PR(1, 0, −1) equalization algorithm.

19. The data reproducing apparatus according to claim 18, wherein the value preceding said first value to be processed from among said sampling values constituting said synchronous data is regarded as said second value, while the value preceding said second value is regarded as a third value;
  wherein said phase position determining means determines whether or not said reverse phase condition is in effect, based on a combination of a third slice value corresponding to said third value, a second slice value corresponding to said second value, and a first slice value corresponding to said first value from among said slice values calculated by said slicing means;
  wherein, if said reverse phase condition is not found to be in effect, said phase error information calculating means calculates said phase error information in accordance with a first operational method using an operation expression given as phase_err=(data_now*slice_D)−(data_D*slice_now)

where, data_now stands for said first value, data_D for said second value, slice_now for said first slice value, slice_D for said second slice value, and phase_err for said phase error information; and
  wherein, if said reverse phase condition is found to be in effect, said phase error information calculating means calculates said phase error information in accordance with a second operational method different from said first operational method.

20. The data reproducing apparatus according to claim 19, wherein said second operational method uses operation expressions given as phase_err_2D=(data_now×slice_D)−(data_2D× slice_D)

and rev_phase_err_2D=−phase_err_2D where, data_2D stands for said third value, slice_2D for said third slice value, and rev_phase_err_2D for said phase error information.

21. The data reproducing apparatus according to claim 19, wherein said second operational method uses operation expressions given as $$phase\_err\_2D = (data\_now \times slice\_D) - (data\_2D \times slice\_D)$$

and $$rev\_phase\_err\_2D = (\text{reversed sign of phase\_err\_2D output}) \times RLEV$$

where, data_2D stands for said third value, slice_2D for said third slice value, and (reversed sign of phase_err_2D output)×RLEV for a minus sign if phase_err_2D has a plus sign and for a plus sign if phase_err_2D has a minus sign; RLEV denotes a predetermined constant, and rev_phase_err_2D represents said phase error information.

22. The data reproducing apparatus according to claim 21, wherein RLEV=0 in said operation expressions used by said second operational method.

* * * * *